(12) United States Patent
Fujii et al.

(10) Patent No.: US 10,766,336 B2
(45) Date of Patent: Sep. 8, 2020

(54) AIR CONDITIONING DEVICE FOR VEHICLE

(71) Applicant: DENSO CORPORATION, Kariya, Aichi-pref. (JP)

(72) Inventors: Takahisa Fujii, Kariya (JP); Hideaki Kako, Kariya (JP); Masafumi Kawashima, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 99 days.

(21) Appl. No.: 16/078,162

(22) PCT Filed: Jan. 26, 2017

(86) PCT No.: PCT/JP2017/002714
§ 371 (c)(1),
(2) Date: Aug. 21, 2018

(87) PCT Pub. No.: WO2017/145631
PCT Pub. Date: Aug. 31, 2017

(65) Prior Publication Data
US 2019/0054793 A1 Feb. 21, 2019

(30) Foreign Application Priority Data
Feb. 23, 2016 (JP) ................... 2016-032212

(51) Int. Cl.
*B60H 1/00* (2006.01)
(52) U.S. Cl.
CPC ....... *B60H 1/0055* (2013.01); *B60H 1/00028* (2013.01); *B60H 1/00064* (2013.01);
(Continued)

(58) Field of Classification Search
CPC .............. B60H 1/0055; B60H 1/00028; B60H 1/00064; B60H 1/00285; B60H 1/00335;
(Continued)

(56) References Cited

U.S. PATENT DOCUMENTS 5,921,100 A 7/1999 Yoshinori et al.
2001/0022222 A1 9/2001 Aoki et al.
(Continued)

FOREIGN PATENT DOCUMENTS

CA 2599057 A1 11/2006
JP H11048772 A 2/1999
(Continued)

OTHER PUBLICATIONS

U.S. Appl. No. 16/078,233, filed Aug. 21, 2018, Fujii et al.

*Primary Examiner* — Davis D Hwu
(74) *Attorney, Agent, or Firm* — Harness, Dickey & Pierce, P.L.C.

(57) ABSTRACT

An air conditioning device for a vehicle includes a seat air conditioning unit that blows out air from a front side of a seat and an interior air conditioning unit that blows out air whose temperature has been adjusted by a cooling heat exchanger and a heating heat exchanger toward the vehicle interior space. The air conditioning device for a vehicle includes a first duct member for guiding the air flowing between the cooling heat exchanger and the heating heat exchanger in the interior air conditioning unit to the seat air conditioning unit. The air conditioning device for a vehicle further includes a second duct member for guiding the air higher in temperature than the air flowing between the cooling heat exchanger and the heating heat exchanger to the seat air conditioning unit.

10 Claims, 13 Drawing Sheets

(52) U.S. Cl.
CPC ..... B60H 1/00285 (2013.01); B60H 1/00335 (2013.01); B60H 1/00521 (2013.01); B60H 1/00535 (2013.01); *B60H 2001/002* (2013.01); *B60H 2001/003* (2013.01); *B60H 2001/00214* (2013.01)

(58) Field of Classification Search
CPC ............ B60H 1/00521; B60H 1/00535; B60H 2001/002; B60H 2001/00214; B60H 2001/003
USPC .......................................................... 165/202
See application file for complete search history.

(56) References Cited

U.S. PATENT DOCUMENTS

| | | | |
|---|---|---|---|
| 2009/0031742 A1* | 2/2009 | Seo | B60N 2/5628 62/244 |
| 2015/0251578 A1 | 9/2015 | Ishii et al. | |

FOREIGN PATENT DOCUMENTS

| | | |
|---|---|---|
| JP | 2000264038 A | 9/2000 |
| JP | 2001206055 A | 7/2001 |
| JP | 2008529894 A | 8/2008 |
| JP | 2009149125 A | 7/2009 |
| WO | WO-2014045538 A1 | 3/2014 |

* cited by examiner

AIR CONDITIONING DEVICE FOR VEHICLE

CROSS-REFERENCE TO RELATED APPLICATIONS

This application is a U.S. National Phase Application under 35 U.S.C. 371 of International Application No. PCT/JP2017/002714 filed on Jan. 26, 2017 and published in Japanese as WO/2017/145631 A1 on Aug. 31, 2017. This application is based on and claims the benefit of priority from Japanese Patent Application No. 2016-032212 filed on Feb. 23, 2016. The entire disclosures of all of the above applications are incorporated herein by reference.

TECHNICAL FIELD

The present disclosure relates to an air conditioning device for a vehicle capable of supplying air whose temperature has been adjusted by an interior air conditioning unit to a seat air conditioning unit.

BACKGROUND ART

Up to now, an air conditioning function of a seat has been required to quickly cool down or to quickly warm up and a uniform thermal sensation without temperature bias. In response to such a requirement, a seat air conditioner that has been proposed which is capable of switching between a mode for blowing out the air whose temperature has been adjusted by an air conditioning unit from a seating surface of a seat and a mode for blowing out the vehicle interior air from the seating surface of the seat (for example, refer to Patent Literature 1).

PRIOR ART LITERATURES

Patent Literature

Patent Literature 1: JP H11-48772 A

SUMMARY OF INVENTION

The present inventors have investigated functions of the seat air conditioning unit required by the user. As a result of the investigation, in recent years, the present inventors have found that the seat air conditioning unit tends to be required to have different functions such as anti-drowsiness, partial temperature adjustment and the like.

In view of such a tendency, the present inventors have studied a response to the above-mentioned user's requirement by imparting different thermal sensations to the user through the seat air conditioning unit.

However, since a structure of the conventional seat air conditioning device for a vehicle is designed on the premise of imparting a uniform thermal sensation to the user, there is a problem that it is difficult to impart the different thermal sensation to the user through the seat air conditioning unit.

The present disclosure aims to provide an air conditioning device for a vehicle capable of imparting different thermal sensations to a user through a seat air conditioning unit.

According to one aspect of the present disclosure, an air conditioning device for a vehicle includes a seat air conditioning unit provided in a seat which is disposed in a vehicle interior space, the seat air conditioning unit being configured to blow out air from a front side of the seat, an interior air conditioning unit that includes a cooling heat exchanger which cools air and a heating heat exchanger which heats air having passed through the cooling heat exchanger, the interior air conditioning unit being configured to blow out air whose temperature has been adjusted by the cooling heat exchanger and the heating heat exchanger into the vehicle interior space, a first duct member that guides air flowing between the cooling heat exchanger and the heating heat exchanger in the interior air conditioning unit to the seat air conditioning unit, and a second duct member that guides air higher in temperature than the air flowing between the cooling heat exchanger and the heating heat exchanger to the seat air conditioning unit.

As described above, with the configuration having the first duct member and the second duct member for guiding air different in temperature to the seat air conditioning unit, the air different in temperature can be blown out to the user through the seat air conditioning unit at the same time. In other words, according to the configuration including the first duct member and the second duct member for guiding the air different in temperature to the seat air conditioning unit, the air conditioning device for a vehicle capable of imparting different thermal sensations to the user through the seat air conditioning unit at the same time can be realized.

DESCRIPTION OF EMBODIMENTS

Figure 1:
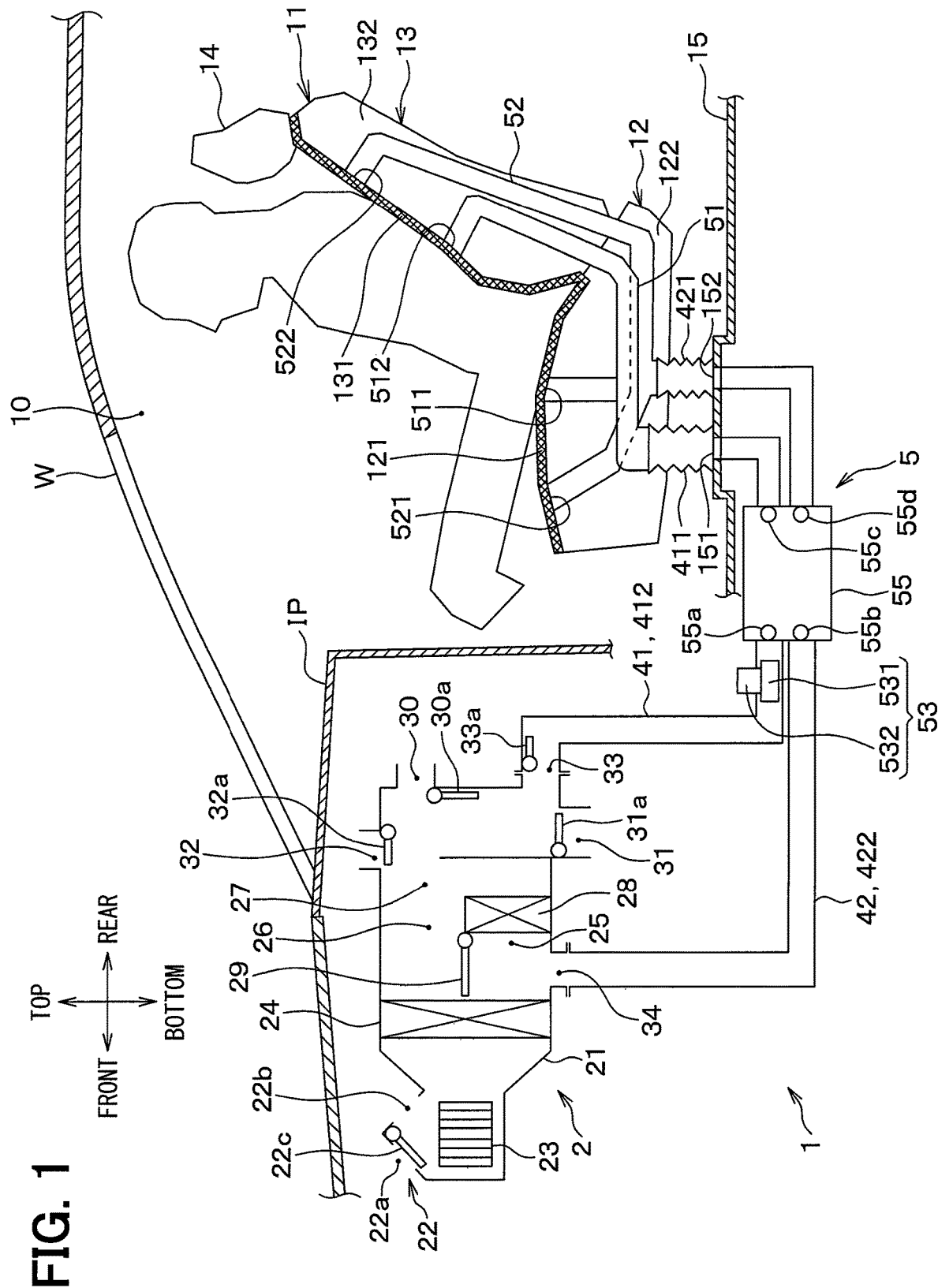
FIG. 1 is a diagram illustrating a schematic configuration of an air conditioning device for a vehicle according to a first embodiment.

Hereinafter, embodiments of the present disclosure will be described with reference to the drawings. In each of the following embodiments, parts that are the same as or equivalent to those described in the preceding embodiment are denoted by the same reference numerals, and a description of the same parts may be omitted. Also, in each of the embodiments, when only a part of the components is described, the components described in the preceding embodiments can be applied to the other parts of the components. The following embodiments can partially combine the embodiments with each other even in a case where the combination does not cause hindrance, even if not expressly stated.

First Embodiment

The present embodiment will be described with reference to FIGS. 1 to 5. An air conditioning device for a vehicle 1 shown in FIG. 1 includes an interior air conditioning unit 2 that conditions air in a vehicle interior space 10, and a seat air conditioning unit 5 for use in a seat 11 disposed in the vehicle interior space 10. It should be noted that arrows indicating up, down, left, right and front and rear shown in the drawings indicate an up-down direction, a right-left direction, and a front-rear direction when mounted on the vehicle.

First, the interior air conditioning unit 2 will be described. The interior air conditioning unit 2 is disposed inside an instrument panel IP at a foremost portion of the vehicle interior space 10. In the interior air conditioning unit 2, an air conditioning blower 23, an evaporator 24, a heater core 28, and the like are accommodated inside an air conditioning case 21 forming an outer shell of the interior air conditioning unit 2. An inside-outside air switching box 22 for switchably introducing a vehicle interior air (hereinafter referred to as inside air) and a vehicle exterior air (hereinafter referred to as outside air) is disposed at a most upstream side of the air conditioning case 21 along an air flow.

The inside-outside air switching box 22 has an inside air introduction port 22a for introducing the inside air into the air conditioning case 21 and an outside air introduction port 22b for introducing the outside air into the air conditioning case 21. An inside-outside air switch door 22c for adjusting opening areas of the inside air introduction port 22a and the outside air introduction port 22b is disposed in the inside-outside air switching box 22. The operation of the inside-outside air switch door 22c is controlled according to a control signal output from a control device 100 to be described later.

An air conditioning blower 23 is disposed on an air flow downstream side of the inside-outside air switching box 22. The air conditioning blower 23 is configured to blow the air drawn through the inside-outside air switching box 22 toward the vehicle interior space 10. The air conditioning blower 23 is an electric blower capable of changing a rotational speed according to the control signal from the control device 100 to be described later. A centrifugal fan, an axial flow fan, a cross flow fan, or the like can be adopted as a fan of the air conditioning blower 23.

The evaporator 24 is disposed on the air flow downstream side of the air conditioning blower 23. The evaporator 24 is a cooling heat exchanger that exchanges heat between a refrigerant flowing inside and an air blown from the air conditioning blower 23 to cool the blown air. The evaporator 24 according to the present embodiment forms a vapor compression type refrigeration cycle together with a compressor, a condenser, an expansion valve not shown, and the like.

A hot air passage 25, a cold air bypass passage 26, and a mixing space 27 are provided on the air flow downstream side of the evaporator 24 in the air conditioning case 21. The air having passed through the evaporator 24 flows through the hot air passage 25 and the cold air bypass passage 26. The air having flowed out of the hot air passage 25 and the cold air bypass passage 26 is mixed together in the mixing space 27.

The heater core 28 for heating the air that has passed through the evaporator 24 is disposed in the hot air passage 25. The heater core 28 is a heating heat exchanger that exchanges heat between a coolant water for cooling an engine not shown and the blown air that has passed through the evaporator 24 to heat the blown air. In the present embodiment, the evaporator 24 and the heater core 28 form a temperature adjustment device installed in the interior air conditioning unit 2.

The cold air bypass passage 26 is an air passage for leading the air having passed through the evaporator 24 to the mixing space 27 without passing through the heater core 28. Therefore, a temperature of the blown air mixed in the mixing space 27 changes according to an air volume ratio of the air passing through the hot air passage 25 and the air passing through the cold air bypass passage 26.

Therefore, in the present embodiment, an air mixing door 29 is disposed on the air flow downstream side of the evaporator 24 and on an inlet side of the hot air passage 25 and the cold air bypass passage 26. The air mixing door 29 changes the air volume ratio of the cold airs flowing into the hot air passage 25 and the cold air bypass passage 26. The air mixing door 29 functions as a temperature adjustment member for adjusting the air temperature in the mixing space 27. The operation of the air mixing door 29 is controlled according to the control signal output from the control device 100 to be described later.

Further, first to fourth air conditioning opening portions 30 to 33 are provided in an air flow most downstream portion of the air conditioning case 21. The first to fourth air conditioning opening portions 30 to 33 blow out the blown air whose temperature has been adjusted in the mixing space 27. The first air conditioning opening portion 30 is an opening through which air is blown toward the upper body of the occupant in the vehicle interior space 10. The second air conditioning opening portion 31 is an opening through which air is blown toward feet of the occupant. The third air conditioning opening portion 32 is an opening through which air is blown toward an inside of a window glass W on a front side of the vehicle. The fourth air conditioning opening portion 33 is an opening through which air is supplied to the seat air conditioning unit 5.

First to fourth mode doors 30a to 33a are disposed on the air flow upstream side of the first to fourth air conditioning opening portions 30 to 33. The first to fourth mode doors 30a to 33a adjust the respective opening areas. The first to fourth mode doors 30a to 33a form a blowing port mode switching unit that switches the blowing port mode to another. The operation of the first to fourth mode doors 30a to 33a is controlled according to the control signal output from the control device 100 to be described later.

Further, in the air conditioning case 21 according to the present embodiment, an intermediate opening portion 34 through which the air having passed through an evaporator 24 flow out to an outside is provided between the evaporator 24 and a heater core 28. As with the fourth air conditioning opening portion 33, the intermediate opening portion 34 is an opening portion through which the air is supplied to the seat air conditioning unit 5.

As described above, the interior air conditioning unit 2 according to the present embodiment includes the evaporator 24 that cools the air and the heater core 28 that heats the air having passed through the evaporator 24, and is configured so as to the air whose temperature has been adjusted by the evaporator 24 and the heater core 28 into the vehicle interior space 10.

Next, the seat air conditioning unit 5 will be described. The seat air conditioning unit 5 according to the present embodiment is configured so as to blow out the air supplied from the interior air conditioning unit 2 from the front side of the seat 11.

The seat air conditioning unit 5 is provided on the seat 11 disposed in front of the vehicle interior space 10. The seat 11 provided with the seat air conditioning unit 5 includes a seat cushion portion 12 for supporting a lower body of the occupant, a seat back portion 13 for supporting an upper body of the occupant, and a headrest portion 14 for supporting a head of the occupant.

The seat cushion portion 12 is a member for supporting buttocks and thighs of a user (that is, occupant). The seat cushion portion 12 includes a skin member 121 that covers a front side that forms a contact surface of the user on the seat 11, and a pad member 122 that is covered with the skin member 121.

The seat back portion 13 is a member that mainly supports a waist and a back of the user. As with the seat cushion portion 12, the seat back portion 13 includes a skin member 131 that covers a front side which forms a contact surface of the user on the seat 11, and a pad member 132 that is covered with the skin member 131.

Although not shown, each of the skin members 121 and 131 of the seat cushion portion 12 and the seat back portion 13 are provided by a skin contacting the user and a cushion portion disposed on a back side of the skin. The skin is made of a member having air permeability such as a woven fabric, a mesh sheet, or the like. Further, the cushion portion is made of a member having air permeability such as cotton or synthetic resin sponge.

The pad members 122 and 132 of the seat cushion portion 12 and the seat back portion 13 are disposed on the back side of the skin members 121 and 131. The pad members 122 and 132 are members that exert a cushioning action, and have sufficiently large thicknesses as compared with the skin members 121 and 131. Unlike the skin members 121 and 131, the pad members 122 and 132 are made of a material having no air permeability (for example, foam material such as urethane foam). Although not shown, a metal frame forming a skeleton is installed inside each of the seat cushion portion 12 and the seat back portion 13.

A main blowing duct 51 and an auxiliary blowing duct 52 are disposed in each of the seat cushion portion 12 and the seat back portion 13. The main blowing duct 51 and the auxiliary blowing duct 52 form an air flow passage for the air blown from the front side of the seat 11 as a component of the seat air conditioning unit 5. The main blowing duct 51 and the auxiliary blowing duct 52 according to the present embodiment are configured to be independent from each other so that the air flowing through each of the main blowing duct 51 and the auxiliary blowing duct 56 is not mixed with each other.

The main blowing duct 51 is disposed across both of the seat cushion portion 12 and the seat back portion 13. The main blowing duct 51 is provided with a first blowing opening portion 511 and a second blowing opening portion 512 as openings that open to the skin members 121 and 131 of the seat cushion portion 12 and the seat back portion 13, respectively.

The main blowing duct 51 according to the present embodiment is branched inside the seat 11 such that the air is blown out from both of the first blowing opening portion 511 provided in the seat cushion portion 12 and the second blowing opening portion 512 provided in the seat back portion 13.

Likewise, the auxiliary blowing duct 52 is disposed across both of the seat cushion portion 12 and the seat back portion 13. The auxiliary blowing duct 52 is provided with a third blowing opening portion 521 and a fourth blowing opening portion 522 as openings that open to the skin members 121 and 131 of the seat cushion portion 12 and the seat back portion 13, respectively.

The auxiliary blowing duct 52 according to the present embodiment is branched inside the seat 11 such that the air is blown out from both of the third blowing opening portion 521 provided in the seat cushion portion 12 and the fourth blowing opening portion 522 provided in the seat back portion 13.

The third blowing opening portion 521 according to the present embodiment opens to a front side of a position where the first blowing opening portion 511 is provided in the seat cushion portion 12. If the third blowing opening portion 521 is open at a position different from the position at which the first blowing opening portion 511 is provided in the seat cushion portion 12, the third blowing opening portion 521 may be open at another position of the seat cushion portion 12.

The fourth blowing opening portion 522 according to the present embodiment opens above the second blowing opening portion 512 in the seat back portion 13. If the fourth blowing opening portion 522 is open at a position different from the position at which the second blowing opening portion 512 is provided in the seat back portion 13, the fourth blowing opening portion 522 may be open at another position of the seat back portion 13.

The air conditioning device for a vehicle 1 according to the present embodiment is provided with the main duct member 41 and the auxiliary duct member 42 such that the different thermal sensations can be imparted to the occupant who is a user through the seat air conditioning unit 5.

The main duct member 41 is a member that guides the air whose temperature has been adjusted by the evaporator 24 and the heater core 28 in the interior air conditioning unit 2 to the seat air conditioning unit 5. The auxiliary duct member 42 is a member that guides the air flowing between the evaporator 24 and the heater core 28 in the interior air conditioning unit 2 to the seat air conditioning unit 5.

The auxiliary duct member 42 according to the present embodiment is connected between the evaporator 24 and the heater core 28 in the interior air conditioning unit 2 so that an air flow generated by the air conditioning blower 23 flows in the auxiliary duct member 42. According to the present embodiment, the auxiliary duct member 42 is a first duct for guiding the air flowing between the evaporator 24 and the heater core 28 in the interior air conditioning unit 2 to the seat air conditioning unit 5. According to the present embodiment, the main duct member 41 is a second duct member for guiding the air higher in temperature than the air flowing between the evaporator 24 and the heater core 28 in the interior air conditioning unit 2 to the seat air conditioning unit 5.

According to the present embodiment, one end side of the main duct member 41 is connected to the fourth air conditioning opening portion 33 of the interior air conditioning unit 2 so that the air whose temperature has been adjusted by the evaporator 24 and the heater core 28 is guided to the seat air conditioning unit 5. The other end side of the main duct member 41 is connected to the main blowing duct 51 of the seat air conditioning unit 5 so that the air whose temperature has been adjusted by the evaporator 24 and the heater core 28 is guided to the main blowing duct 51 of the seat air conditioning unit 5.

More specifically, the main duct member 41 includes a first seat connection portion 411 and a first air conditioning connection portion 412. One end side of the first seat connection portion 411 is connected to an end of the main blowing duct 51 on a back side of the seat 11 and the other end side of the first seat connection portion 411 is connected to a through hole 151 provided in a floor surface 15 of the vehicle. The first seat connection portion 411 is formed of a bellows-shaped duct so as to cope with a movement of the seat 11 in a vertical direction and a longitudinal direction. Incidentally, a duct other than the bellows-shaped duct may be adopted as the first seat connection portion 411 as long as the duct has flexibility.

One end side of the first air conditioning connection portion 412 is connected to the through hole 151 of the floor surface 15 and the other end side of the first air conditioning connection portion 412 is connected to the fourth air conditioning opening portion 33 of the interior air conditioning unit 2. The first air conditioning connection portion 412 is disposed below the floor surface 15 and inside the instrument panel IP so as not to affect a design property of the vehicle interior space 10.

According to the present embodiment, one end side of the auxiliary duct member 42 is connected to the intermediate opening portion 34 of the interior air conditioning unit 2 so that the air that has passed through the evaporator 24 of the interior air conditioning unit 2 is guided to the seat air conditioning unit 5.

The other end side of the auxiliary duct member 42 is connected to the auxiliary blowing duct 52 of the seat air conditioning unit 5 so that the air that has been cooled by the evaporator 24 of the interior air conditioning unit 2 is guided to the auxiliary blowing duct 52 of the seat air conditioning unit 5.

More specifically, the auxiliary duct member 42 includes a second seat connection portion 421 and a second air conditioning connection portion 422. One end side of the second seat connection portion 421 is connected to an end of the auxiliary blowing duct 52 on a back side of the seat 11 and the other end side of the second seat connection portion 421 is connected to a through hole 152 provided in a floor surface 15 of the vehicle. The second seat connection portion 421 is formed of a bellows-shaped duct so as to cope with a movement of the seat 11 in a vertical direction and a longitudinal direction. Incidentally, a duct other than the bellows-shaped duct may be adopted as the second seat connection portion 421 as long as the duct has flexibility.

One end side of the second air conditioning connection portion 422 is connected to the through hole 152 of the floor surface 15 and the other end side of the second air conditioning connection portion 422 is connected to the intermediate opening portion 34 of the interior air conditioning unit 2. The second air conditioning connection portion 422 is disposed below the floor surface 15 and inside the instrument panel IP so as not to affect a design property of the vehicle interior space 10.

In this example, it is conceivable to allow the air to flow from each of the main duct member 41 and the auxiliary duct member 42 to the seat air conditioning unit 5 with the use of the air conditioning blower 23 disposed inside the interior air conditioning unit 2. However, in that case, the air volume of the air blown out from the front side of the seat through the seat air conditioning unit 5 may be insufficient.

In particular, in the configuration in which the air whose temperature has been adjusted by the evaporator 24 and the heater core 28 through the main duct member 41 is guided to the seat air conditioning unit 5 as in the present embodiment, a ventilation resistance is increased by the heater core 28. For that reason, the amount of air flowing from the main duct member 41 to the seat air conditioning unit 5 becomes smaller than the volume of air flowing from the auxiliary duct member 42 to the seat air conditioning unit 5.

Therefore, the main duct member 41 according to the present embodiment is provided with an auxiliary blower 53 for assisting the air blowing from the interior air conditioning unit 2 side to the main blowing duct 51 side. The auxiliary blower 53 is an electric blower that rotates the fan 531 by the electric motor 532.

The auxiliary blower 53 is configured to be capable of changing a rotational speed according to the control signal from the control device 100 to be described later. A centrifugal fan, an axial flow fan, a cross flow fan, or the like can be adopted as a fan of the auxiliary blower 53.

The auxiliary duct member 42 according to the present embodiment is connected between the evaporator 24 and the heater core 28 in the interior air conditioning unit 2 although the auxiliary blower 53 is not provided, and therefore an air flow generated by the air conditioning blower 23 flows in the auxiliary duct member 42.

The air conditioning device for a vehicle 1 according to the present embodiment is provided with a path switching mechanism 55 for switching a supply path for supplying the air to the seat air conditioning unit 5 to another. The path switching mechanism 55 according to the present embodiment is configured so as to switch between a first supply path for supplying the air from both of the duct members 41 and 42 to the seat air conditioning unit 5 and a second supply path for supplying the air from one of the duct members 41 and 42 to the seat air conditioning unit 5.

Specifically, the path switching mechanism 55 according to the present embodiment is provided with a first inlet port 55a, a second inlet port 55b, a first outlet port 55c, and a second outlet port 55d. The first inlet port 55a communicates with an air flow downstream side of the heater core 28 in the interior air conditioning unit 2 through the main duct member 41. The second inlet port 55b communicates between the evaporator 24 and the heater core 28 in the interior air conditioning unit 2 through the auxiliary duct member 42. The first outlet port 55c communicates with the main blowing duct 51 through the main duct member 41. The second outlet port 55d communicates with the auxiliary blowing duct 52 through the auxiliary duct member 42.

Although not shown, the path switching mechanism 55 is provided with a switching door for switching between a communication state in which the first inlet port 55a and the first outlet port 55c communicate with each other and a blocked state in which the first inlet port 55a and the first outlet port 55c do not communicate with each other. Although not shown, the path switching mechanism 55 is provided with a switching door for switching between a communication state in which the second inlet port 55b and the second inlet port 55d communicate with each other and a blocked state in which the second inlet port 55b and the second outlet port 55c do not communicate with each other. The operation of the respective switching doors of the path switching mechanism 55 according to the present embodiment is controlled according to a control signal from the control device 100 to be described later.

Figure 2:
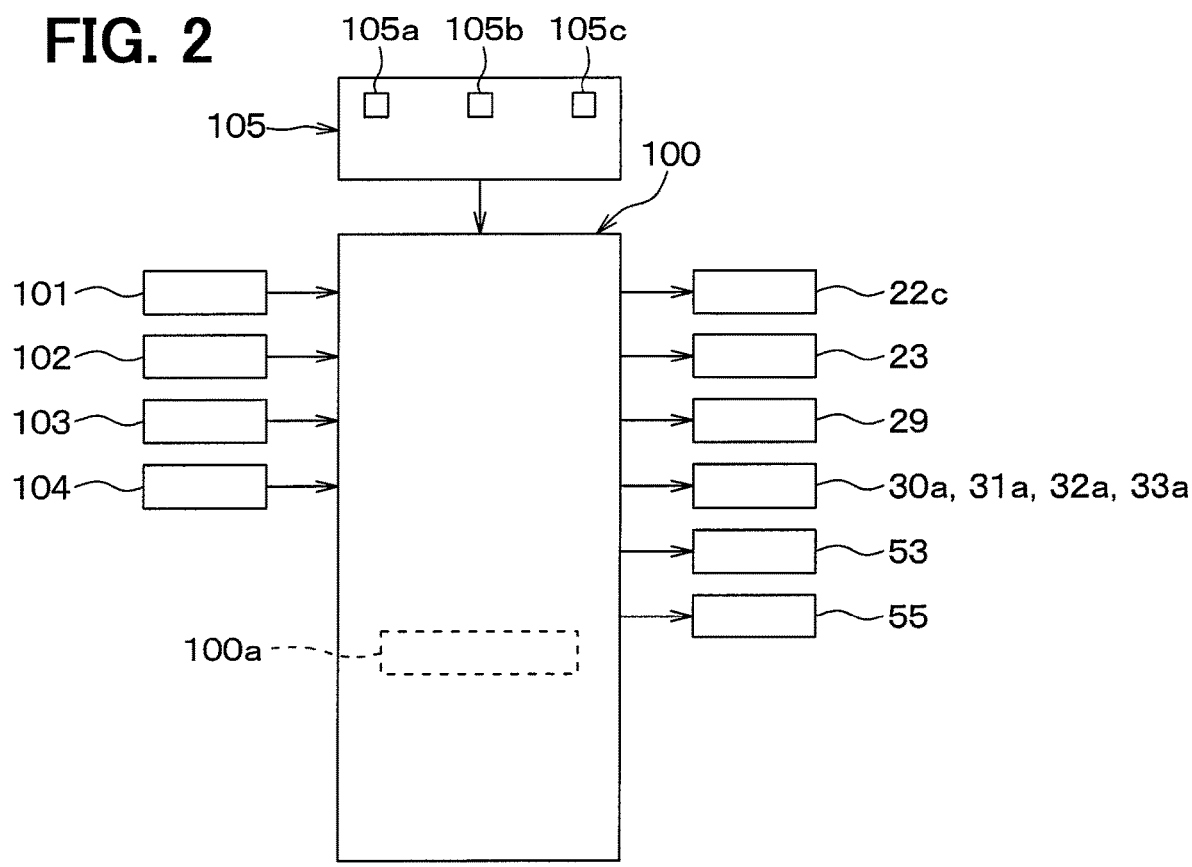
FIG. 2 is a block diagram of a control device according to the first embodiment.

Next, the control device 100 which is an electric control unit of the present embodiment will be described with reference to FIG. 2. The control device 100 includes a microcomputer including a CPU and a storage unit such a ROM and a RAM, and a peripheral circuit of the microcomputer. The control device 100 performs various calculations and processes based on control programs stored in the storage unit, and controls the operation of various devices connected to an output side of the control device 100. The storage unit of the control device 100 is a non-transitory tangible storage medium.

The control device 100 is a device that controls the operation of the interior air conditioning unit 2 and the seat air conditioning unit 5. An output side of the control device 100 is connected with the inside-outside air switch door 22c, the air conditioning blower 23, the air mixing door 29, the first to fourth mode doors 30a to 33a, and so on, which are components of the interior air conditioning unit 2. In addition, an output side of the control device 100 is connected with the auxiliary blower 53, the path switching mechanism 55, and so on which are components of the seat air conditioning unit 5.

An input side of the control device 100 is connected with a various sensor groups such as an inside air sensor 101, an outside air sensor 102, and an insolation sensor 103. The inside air sensor 101 detects an inside air temperature Tr, the outside air sensor 102 detects an outside air temperature Tam, the insolation sensor 103 detects the amount of insolation Ts to the vehicle interior space 10.

Further, an input side of the control device 100 is connected with a reduced wakefulness detection unit 104 that detects a reduced wakefulness state in which the degree of wakefulness of the user has decreased. As the reduced wakefulness detection unit 104, a device that detects a decrease in the degree of wakefulness of the user based on a heart rate of the user is adopted. The present disclosure is not limited to the reduced wakefulness detection unit 104 based on the heart rate of the user, but a device that detects a decrease in the degree of wakefulness of the user based on movement of eyeballs, blinking, the number of blinks, or the like may be adopted.

Further, the input side of the control device 100 is connected with an operation panel 105 that is disposed in the vicinity of the instrument panel IP is connected. An air conditioning operation switch 105a, a vehicle interior temperature setting switch 105b, a seat operation switch 105c of the seat air conditioning unit 5, and the like are provided as various operation switches on the operation panel 105.

The air conditioning operation switch 105a is a switch that outputs a request signal to the control device 100. The request signal is provided for controlling the temperature of the air blown into the vehicle interior space 10 by the interior air conditioning unit 2 by operating the air conditioning blower 23.

The seat operation switch 105c is a switch that outputs to the control device 100 a request signal for blowing out the air from the front side of the seat 11 or drawing the air from the front side of the seat 11.

In this example, the control device 100 according to the present embodiment integrally includes a control unit that controls various devices as control targets which are connected to the output side of the control device 100. The control device 100 functions as a control unit that controls the operation of each component by hardware or software which controls the operation of each component as a control target.

For example, the control device 100 according to the present embodiment executes a mode switching process for switching from a normal seat air conditioning mode to a wakeful seat air conditioning mode when the reduced wakefulness state is detected by the reduced wakefulness detection unit 104. In the present embodiment, the hardware and software for executing the mode switching process in the control device 100 correspond to the mode control unit 100a.

Next, the operation of the interior air conditioning unit 2 and the seat air conditioning unit 5 according to the present embodiment will be described. First, the operation of the interior air conditioning unit 2 will be described. In the interior air conditioning unit 2, when the air conditioning operation switch 105a is turned on, the control device 100 controls various components of the interior air conditioning unit 2 to condition the air in the vehicle interior space 10.

First, the control device 100 calculates a target blowing temperature TAO based on detection signals of various sensor groups and operation signals of the operation panel 105. TAO is a blowing air temperature necessary for bringing the temperature of the vehicle interior space 10 closer to a set temperature Tset set by the setting switch 105b of the operation panel 105. Specifically, the control device 100 calculates TAO based on the set temperature Tset, the inside air temperature Tr, the outside air temperature Tam, and the amount of insolation Ts set by the setting switch 105b through the following Formula F1.

$$TAO = Kset \times Tset - Kr \times Tr - Kam \times Tam - Ks \times Ts + C \qquad \text{F1}$$

Kset, Kr, Kam, and Ks shown in Formula F1 are control gains, and C is a correction constant.

The control device 100 determines the rotational speed of the air conditioning blower 23, and the opening degrees of the inside-outside air switch door 22c, the first to fourth mode doors 30a to 33a, the air mixing door 29, and so on based on the TAO, and outputs the control signal to various devices so as to obtain determined control states. The control device 100 repeats a series of processing such as read of the operation signals and detection signals, calculation of the TAO, determination of a new control state, and output of the control signals.

As a result, the air adjusted to a desired temperature by the interior air conditioning unit 2 is blown into the vehicle interior space 10, so that the temperature of the vehicle interior space 10 approaches the set temperature Tset set by the setting switch 105b.

Next, the operation of the seat air conditioning unit 5 will be described. When the seat operation switch 105c is turned on, the control device 100 controls the various components of the seat air conditioning unit 5 to blow out the air from the front side of the seat 11.

Figure 3:
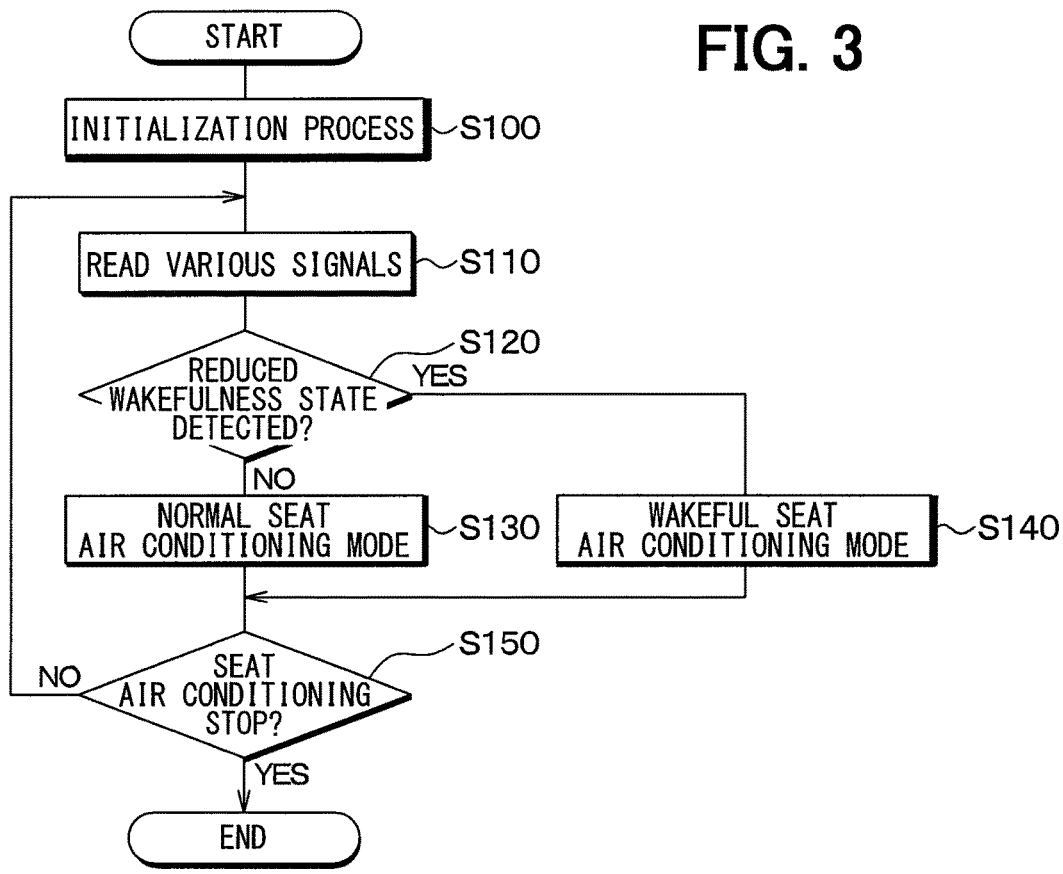
FIG. 3 is a flowchart showing a flow of a control process to be executed by a control device according to the first embodiment.

Hereinafter, a control process of the seat air conditioning unit 5 to be executed by the control device 100 according to the present embodiment will be described with reference to FIG. 3. FIG. 3 shows a flow of processing to be executed by the control device 100 when both of the air conditioning operation switch 105a and the seat operation switch 105c are turned on.

As shown in FIG. 3, the control device 100 executes an initialization process for initializing flags, timers, and so on in Step S100. Then, in Step S110, the control device 100 reads various signals such as the detection signals of various sensor groups and the operation signals of the operation panel 105.

Subsequently, in Step S120, the control device 100 determines whether the user is in a reduced wakefulness state, or not. Specifically, in the determination process in Step S120, the reduced wakefulness detection unit 104 determines whether the reduced wakefulness state is detected, or not.

As a result of the determination process in Step S120, if it is determined that the user is not in the reduced wakefulness state, that is, if the reduced wakefulness state is not detected by the reduced wakefulness detection unit 104, the control device 100 executes the control process in the normal seat air conditioning mode in Step S130.

In the normal seat air conditioning mode, the control device 100 according to the present embodiment operates the auxiliary blower 53, and controls the path switching mechanism 55 so that the air is supplied from the main duct member 41 of the main duct member 41 and the auxiliary duct member 42 to the seat air conditioning unit 5.

Specifically, the control device 100 according to the present embodiment controls the path switching mechanism 55 so that the first inlet port 55a and the first outlet port 55c of the path switching mechanism 55 become in the communication state and the second inlet port 55b and the second outlet port 55d become in the blocked state. When the operation of the auxiliary blower 53 is started, the control device 100 controls the fourth mode door 33a so that the fourth air conditioning opening portion 33 is in an open state.

Figure 4:
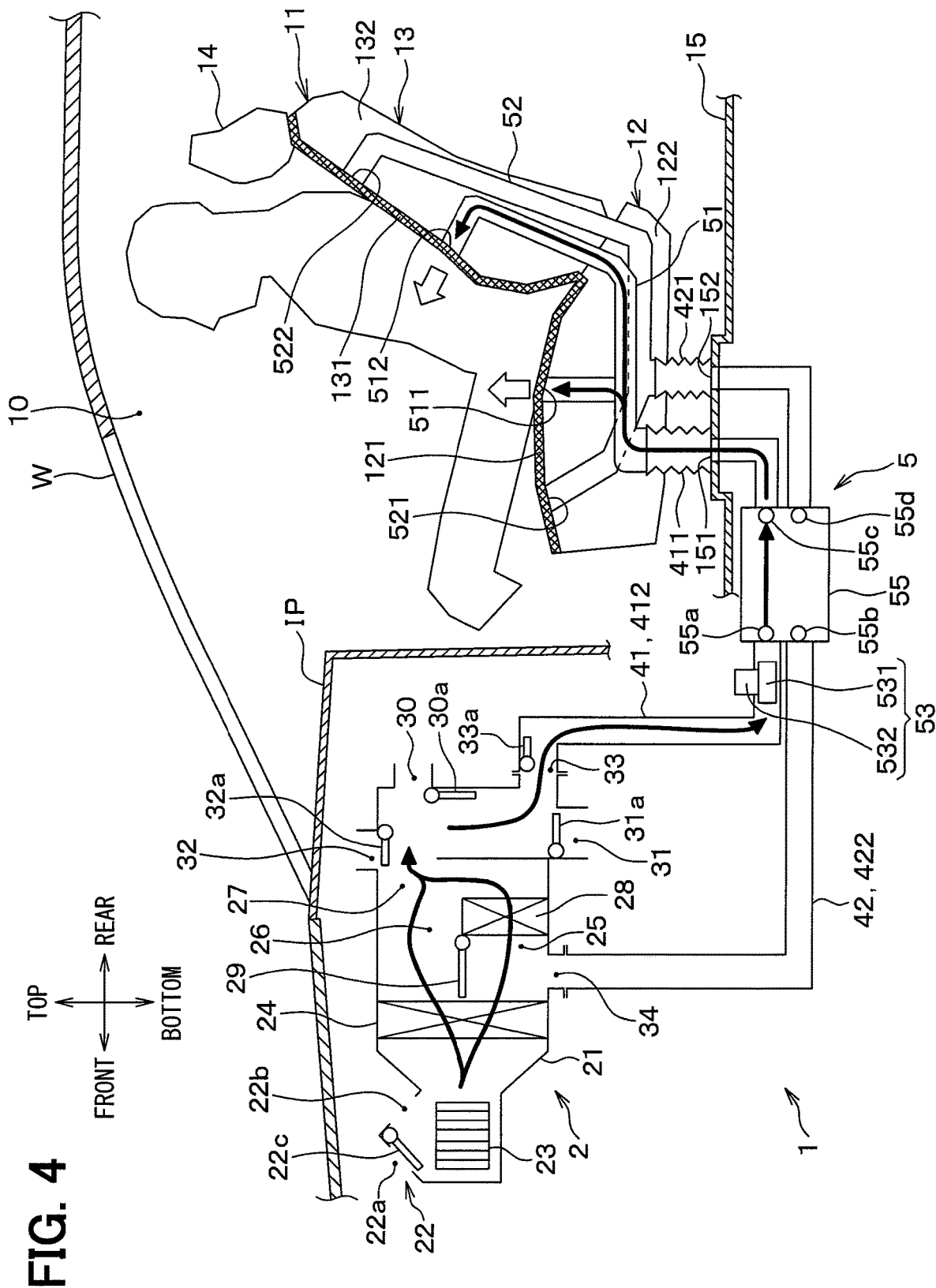
FIG. 4 is an illustrative view illustrating a flow of air during a normal seat air conditioning mode in the air conditioning device for a vehicle according to the first embodiment.

As a result, as indicated by solid arrows in FIG. 4, the air that has been adjusted in temperature by the evaporator 24 and the heater core 28 of the interior air conditioning unit 2 is supplied to the seat air conditioning unit 5 through the main duct member 41. Then, the air supplied to the seat air conditioning unit 5 is blown out from the front side of the seat 11 through the main blowing duct 51.

On the other hand, as a result of the determination process in Step S120, if it is determined that the user is in the reduced wakefulness state, that is, if the reduced wakefulness state is detected by the reduced wakefulness detection unit 104, the control device 100 executes the control process in the wakeful seat air conditioning mode in Step S140.

In the wakeful seat air conditioning mode, the control device 100 according to the present embodiment operates the auxiliary blower 53, and also controls the path switching mechanism 55 so that the air is supplied from both of the main duct member 41 and the auxiliary duct member 42 to the seat air conditioning unit 5.

Specifically, the control device 100 according to the present embodiment controls the path switching mechanism 55 so that the first inlet port 55a and the first outlet port 55c of the path switching mechanism 55 become in the communication state and the second inlet port 55b and the second outlet port 55d become in the communication state. When the operation of the auxiliary blower 53 is started, the control device 100 controls the fourth mode door 33a so that the fourth air conditioning opening portion 33 is in an open state.

Figure 5:
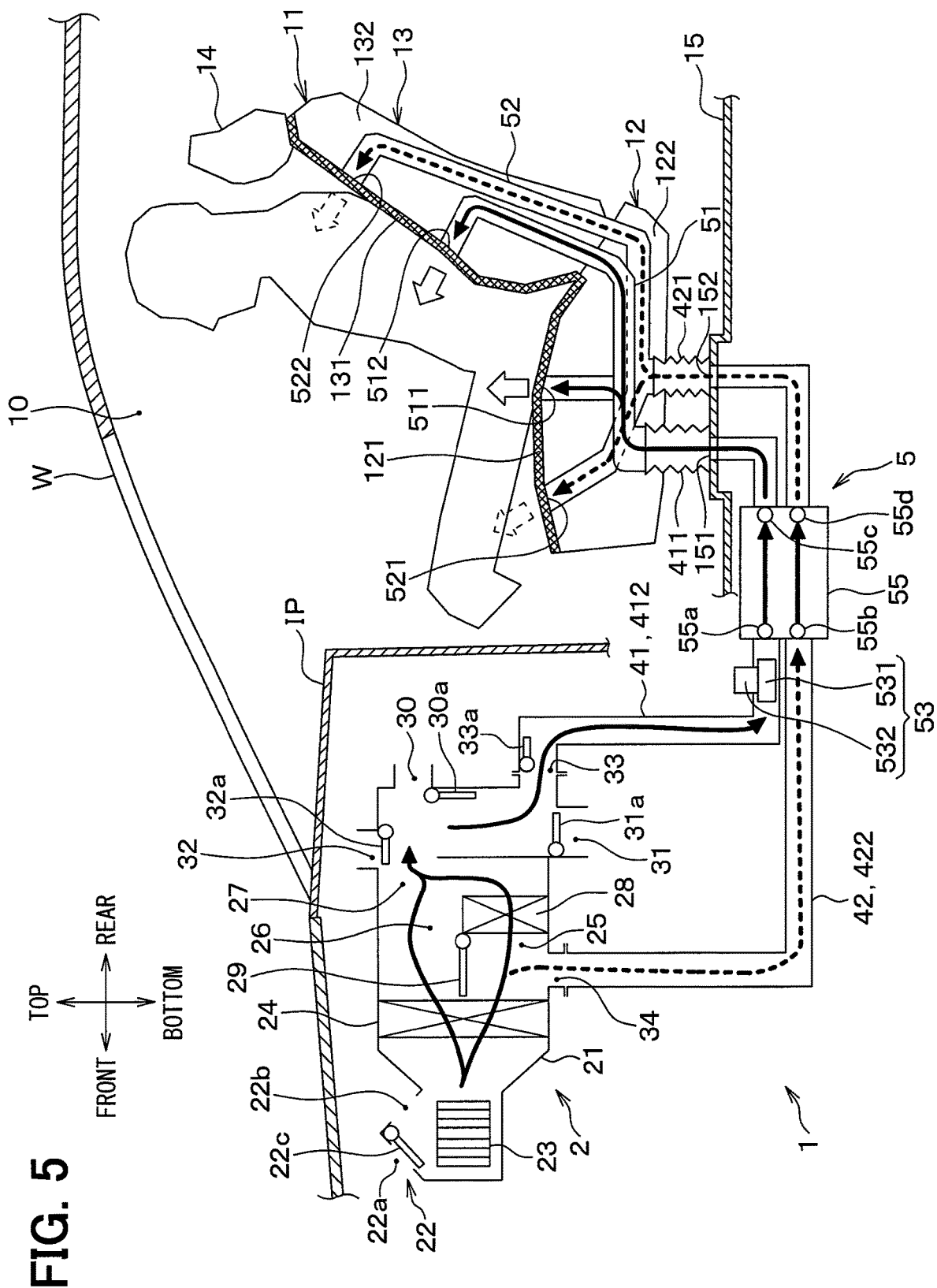
FIG. 5 is an illustrative view illustrating a flow of air during a wakeful seat air conditioning mode in the air conditioning device for a vehicle according to the first embodiment.

As a result, as indicated by solid arrows in FIG. 5, the air that has been adjusted in temperature by the evaporator 24 and the heater core 28 of the interior air conditioning unit 2 is supplied to the seat air conditioning unit 5 through the main duct member 41. Then, the air supplied to the seat air conditioning unit 5 is blown out from the front side of the seat 11 through the main blowing duct 51.

According to the present embodiment, the auxiliary duct member 42 is connected to the interior air conditioning unit 2 so that the air flow generated by the air conditioning blower 23 flows in the auxiliary duct member 42. For that reason, as indicated by dotted arrows in FIG. 5, the air that has been cooled by the evaporator 24 of the interior air conditioning unit 2 is supplied to the seat air conditioning unit 5 through the auxiliary duct member 42. Then, the air supplied to the seat air conditioning unit 5 is blown out from the front side of the seat 11 through the auxiliary blowing duct 52.

After the process in Step S130 or the process in Step S140, the control device 100 determines whether to stop the seat air conditioning unit 5, or not, in Step S150. Specifically, in the determination process of Step S150, it is determined that the seat air conditioning unit 5 is to be stopped when the seat operation switch 105c is turned off, and it is determined that the seat air conditioning unit 5 is not to be stopped when the seat operation switch 105c is kept on.

When it is determined that the seat air conditioning unit 5 is to be stopped in the determination process of Step S150, the control device 100 stops the auxiliary blower 53. When it is determined that the seat air conditioning unit 5 is not to be stopped in the determination process of Step S150, the control device 100 maintains the operation state of the auxiliary blower 53.

The air conditioning device for a vehicle 1 according to the present embodiment described above includes the main duct member 41 for guiding the air whose temperature has been adjusted by the evaporator 24 and the heater core 28 to the seat air conditioning unit 5, and the auxiliary duct member 42 for guiding the air which has been cooled by the evaporator 24 to the seat air conditioning unit 5. In other words, the air conditioning device for a vehicle 1 according to the present embodiment is configured to enable the air different in temperature to be guided to the seat air conditioning unit 5.

According to the above configuration, the air different in temperature can be blown out toward the user through the seat air conditioning unit 5 at the same time, that is, the different thermal sensations can be imparted to the user through the seat air conditioning unit 5.

In particular, in the present embodiment, the air whose temperature has been adjusted by the evaporator 24 and the heater core 28 and the air that has been cooled by the evaporator 24 are supplied to the seat air conditioning unit 5 through the main duct member 41 and the auxiliary duct member 42. According to the above configuration, the air greatly different in temperature can be blown out toward the user at the same time. The configuration in which the air different in temperature is blown out at the same time as described above is suitable for the prevention of drowsiness of the user.

Further, according to the present embodiment, the auxiliary blower 53 is disposed in the main duct member 41. This makes it possible to sufficiently secure the volume of air blown from the front side of the seat 11 through the main duct member 41 and the seat air conditioning unit 5. Such a configuration is suitable for imparting the different thermal sensations to the user.

Further, the air conditioning device for a vehicle 1 according to the present embodiment is provided with a path switching mechanism 55 for switching a supply path for supplying the air to the seat air conditioning unit 5 to another. According to the above configuration, in a situation where the different thermal sensation is required, the air different in temperature air can be guided to the seat air conditioning unit 5 from the respective duct members 41 and 42 In addition, in a situation where the different thermal sensation is not required, comfortable temperature air can be guided from the main duct member 41 to the seat air conditioning unit 5. As described above, with the provision of the path switching mechanism 55, the air conditioning device for a vehicle 1 according to the present embodiment can provide the thermal sensation according to the user's request.

Furthermore, in the seat air conditioning unit 5 according to the present embodiment, the main blowing duct 51 and the auxiliary blowing duct 52 are provided as air flow ducts individually corresponding to the main duct member 41 and the auxiliary duct member 42. The main blowing duct 51 and the auxiliary blowing duct 52 are configured to be independent from each other so that the air flowing through each of the main blowing duct 51 and the auxiliary blowing duct 56 is not mixed with each other.

For that reason, in the air conditioning device for a vehicle 1 according to the present embodiment, in a state where the temperature difference between the air flowing through the main duct member 41 and the air flowing through the auxiliary duct member 42 is secured, the air different in temperature can be blown out from the front side of the seat 11.

First Modification of First Embodiment

In the first embodiment described above, in the normal seat air conditioning mode, the first inlet port 55a and the first outlet port 55c of the path switching mechanism 55 communicate with each other, and the communication between the second inlet port 55b and the second outlet port 55d is blocked. However, the present disclosure is not limited to the above example.

Figure 6:
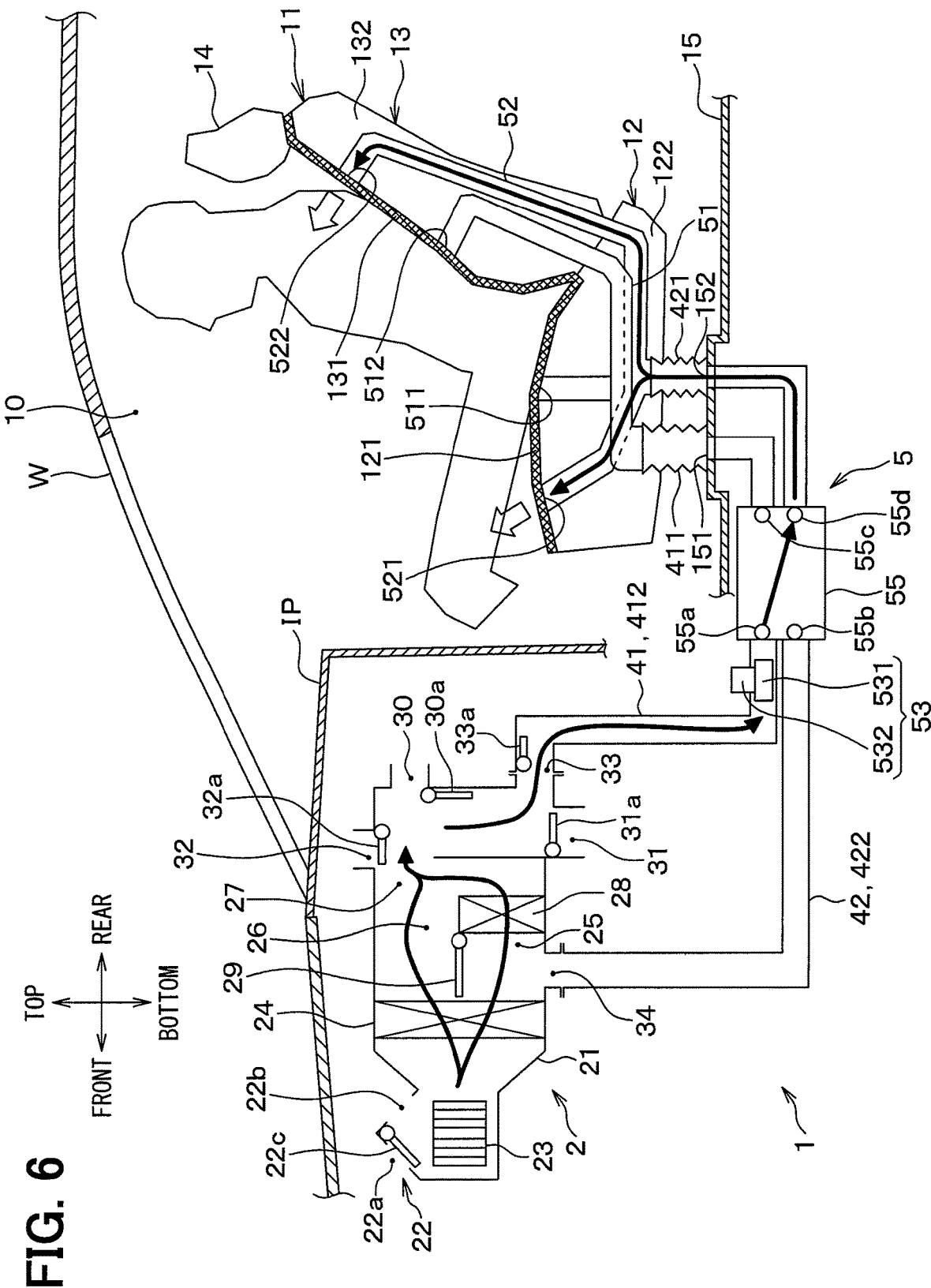
FIG. 6 is a diagram illustrating a schematic configuration of an air conditioning device for a vehicle according to a first modification of the first embodiment.

For example, as shown in FIG. 6, in the normal seat air conditioning mode, the control device 100 may control the path switching mechanism 55 so that the first inlet port 55a and the second outlet port 55d communicate with each other and the second inlet port 55b and the first outlet port 55c are blocked.

According to the above configuration, as indicated by solid arrows in FIG. 6, the air that has been adjusted in temperature by the evaporator 24 and the heater core 28 of the interior air conditioning unit 2 is supplied to the seat air conditioning unit 5 through the main duct member 41. Then, the air supplied to the seat air conditioning unit 5 is blown out from the front side of the seat 11 through the auxiliary blowing duct 52. As a result, comfortable temperature air can be guided from the main duct member 41 to the seat air conditioning unit 5.

Second Modification of First Embodiment

In the first embodiment described above, the configuration that includes the auxiliary blower 53 for generating the air flow from the main duct member 41 to the seat air conditioning unit 5 has been described, but the present disclosure is not limited to the above configuration.

The air conditioning device for a vehicle 1 may be provided with an auxiliary blower 53A for generating an air flow from both of the main duct member 41 and the auxiliary duct member 42 toward the seat air conditioning unit 5.

Figure 7:
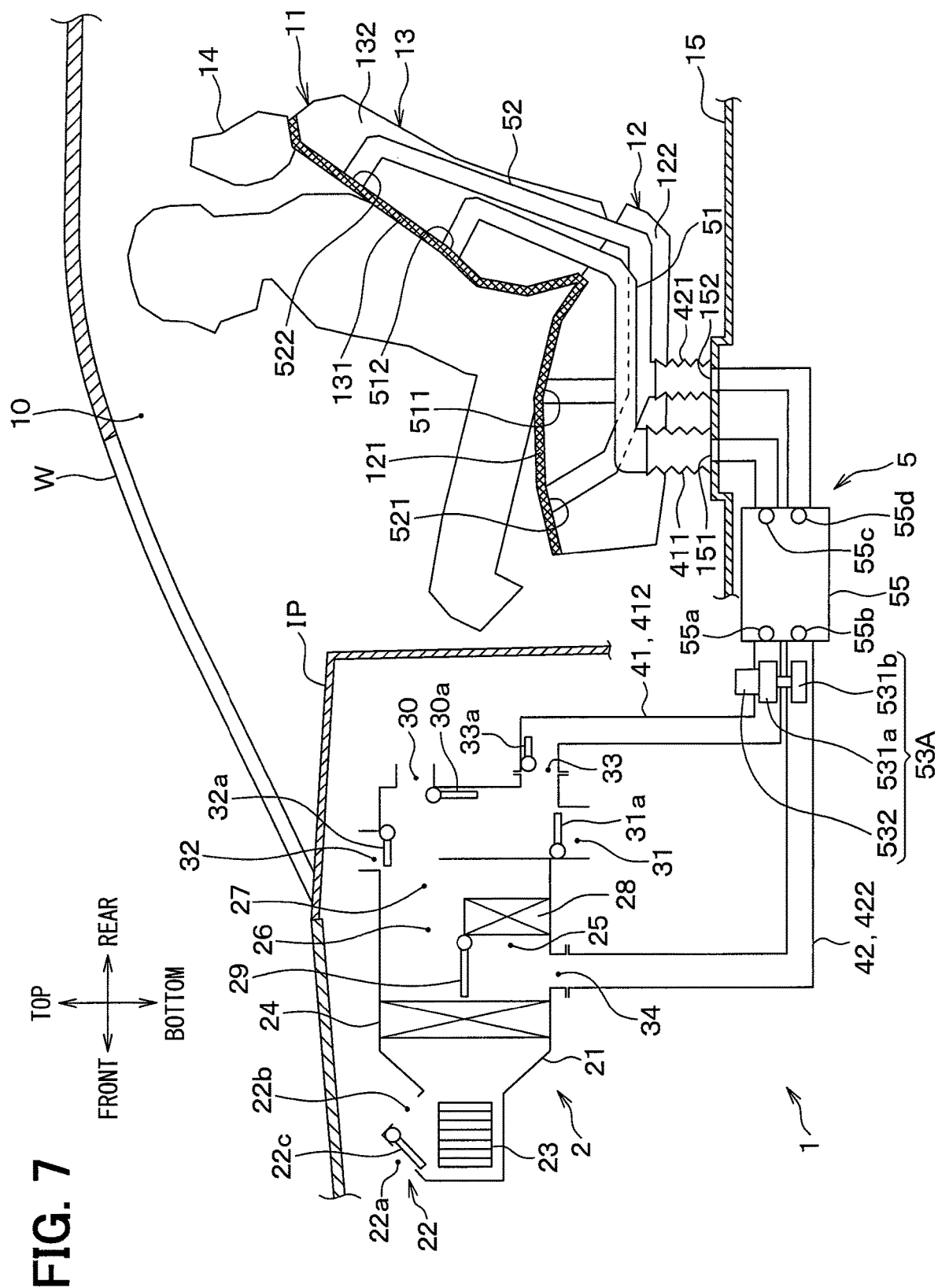
FIG. 7 is a diagram illustrating a schematic configuration of an air conditioning device for a vehicle according to a second modification of the first embodiment.

In that case, as shown in FIG. 7, the auxiliary blower 53A has a configuration including a first fan 531a disposed in the main duct member 41, a second fan 531b disposed in the auxiliary duct member 42, and a single electric motor 532. In this way, if the respective fans 531a and 531b are driven by the common electric motor 532 so as to generate the air flow in both of the main duct member 41 and the auxiliary duct member 42, an increase in the number of parts accompanying the addition of the auxiliary blower 53A can be prevented.

As in the present modification, it is preferable that the auxiliary blower 53A drives the first fan 531a and the second fan 531b by the common electric motor 532, but the present disclosure is not limited to the above configuration. The auxiliary blower 53A may have two electric motors corresponding to the first fan 531a and the second fan 531b.

Third Modification of First Embodiment

In the first embodiment described above, the example in which the fourth air conditioning opening portion 33 is provided in the air conditioning case 21 of the interior air conditioning unit 2 and one end side of the main duct member 41 is connected to the fourth air conditioning opening portion 33 has been described. However, the present disclosure is not limited to the above example.

Figure 8:
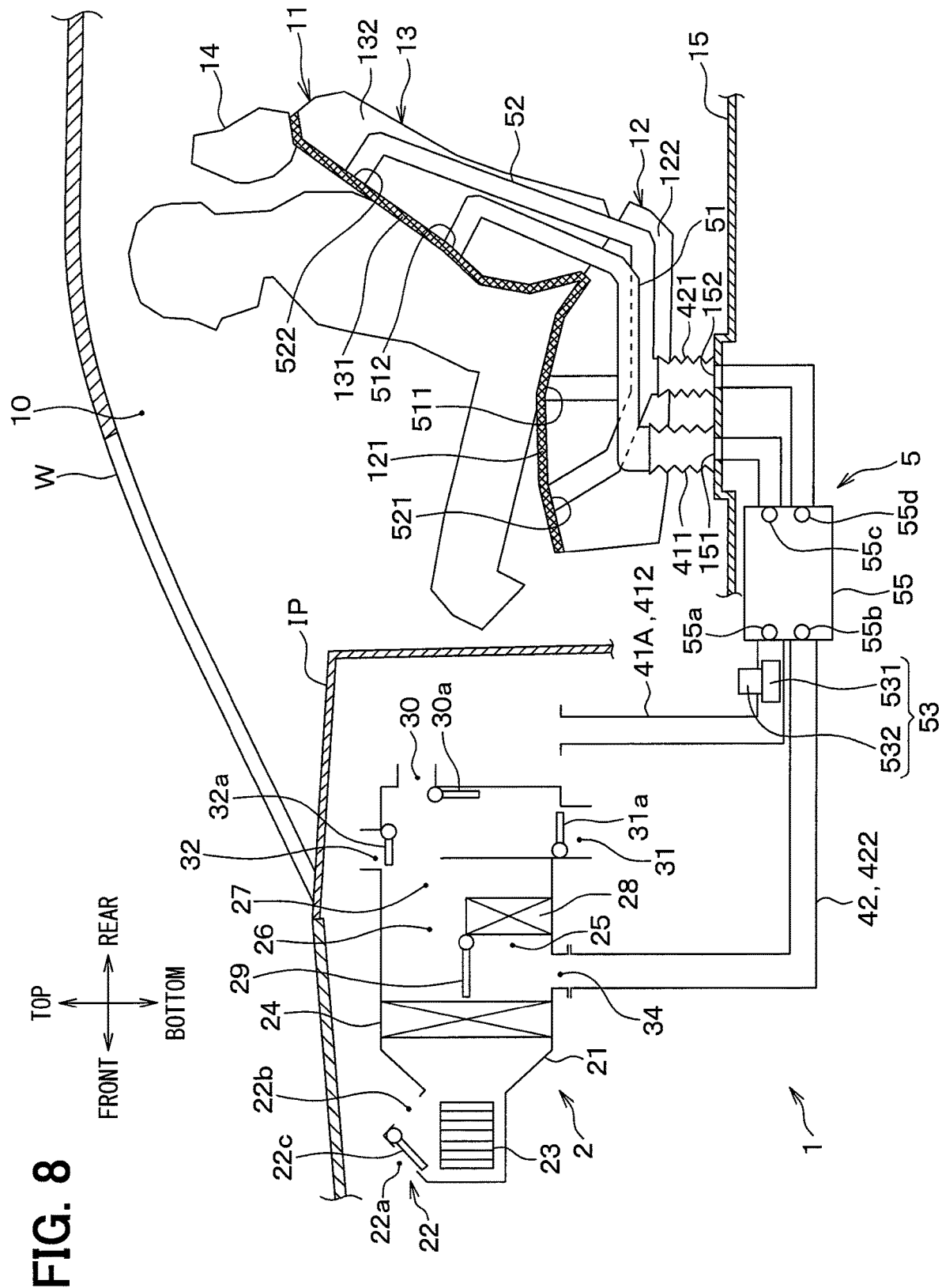
FIG. 8 is a diagram illustrating a schematic configuration of an air conditioning device for a vehicle according to a third modification of the first embodiment.

As shown in FIG. 8, the air conditioning device for a vehicle 1 may be configured so that one end side of the main duct member 41A communicates with the vehicle interior space 10. In that case, the vehicle interior air which is higher in temperature than the air flowing through the auxiliary duct member 42 flows through the main duct member 41A. Therefore, also with the configuration of the present modification, the different heat sensation can be given to the user through the seat air conditioning unit 5 as in the first embodiment.

Second Embodiment

Next, a second embodiment will be described with reference to FIGS. 9 to 14. The present embodiment is different from the first embodiment in that an inside air duct member 43 for introducing an inside air in which a vehicle interior space 10 is present is connected to a path switching mechanism 55.

Figure 9:
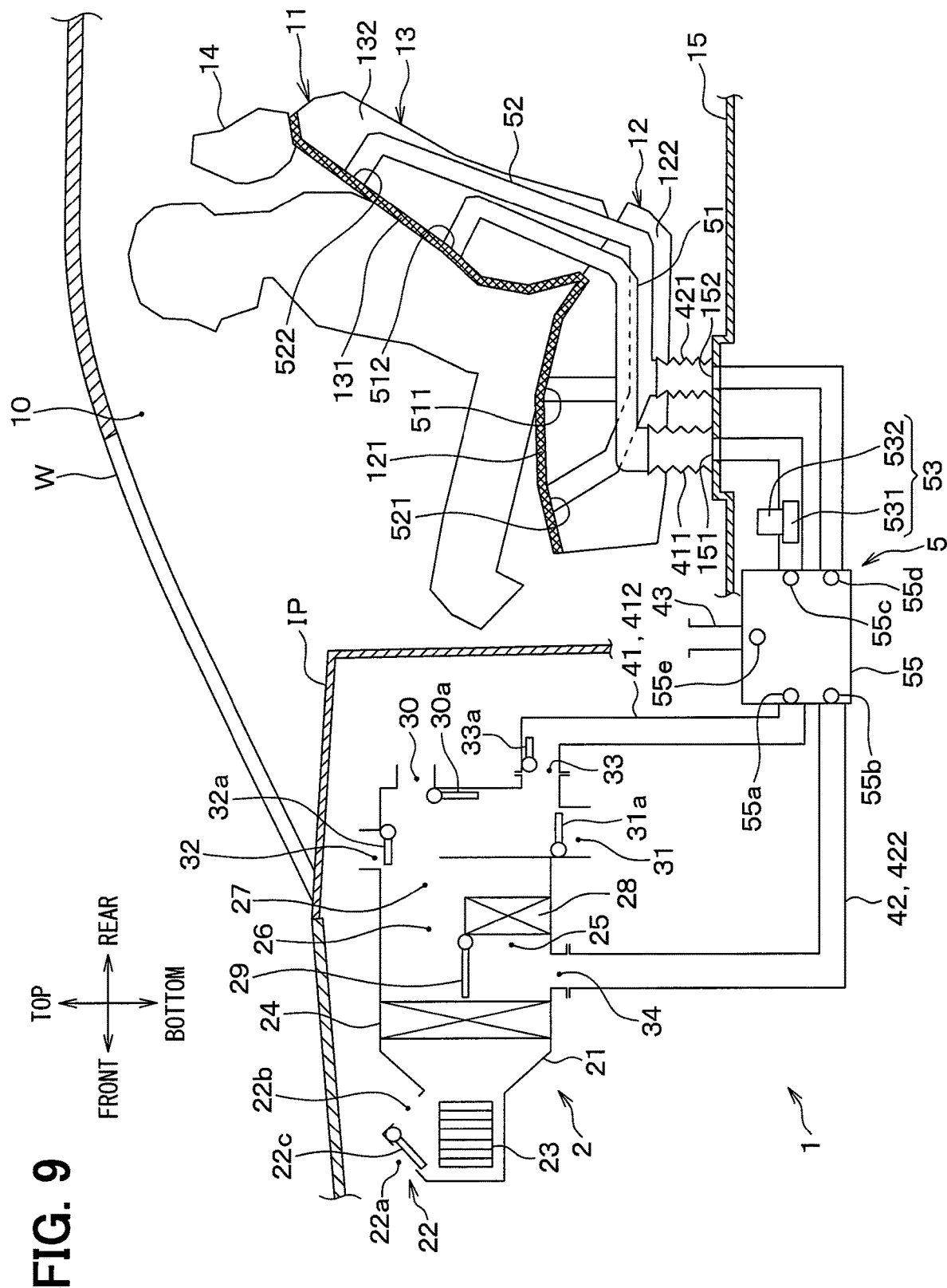
FIG. 9 is a diagram illustrating a schematic configuration of an air conditioning device for a vehicle according to a second embodiment.

As shown in FIG. 9, the inside air duct member 43 is connected to the path switching mechanism 55 according to the present embodiment. The path switching mechanism 55 according to the present embodiment is provided with a third inlet port 55e for introducing an inside air from the inside air duct member 43. In an auxiliary blower 53 according to the present embodiment, a fan 531 is disposed on an air flow downstream side of the path switching mechanism 55 in a main duct member 41 so that the inside air can be supplied to the seat air conditioning unit 5 through the inside air duct member 43.

As described above, the path switching mechanism 55 according to the present embodiment is configured such that the air can be supplied to the seat air conditioning unit 5 through the inside air duct member 43 different from the main duct member 41 and the auxiliary duct member 42. In the present embodiment, the inside air duct member 43 is a third duct member which is different from the auxiliary duct member 42 forming the first duct member and the main duct member 41 forming the second duct member.

Figure 10:
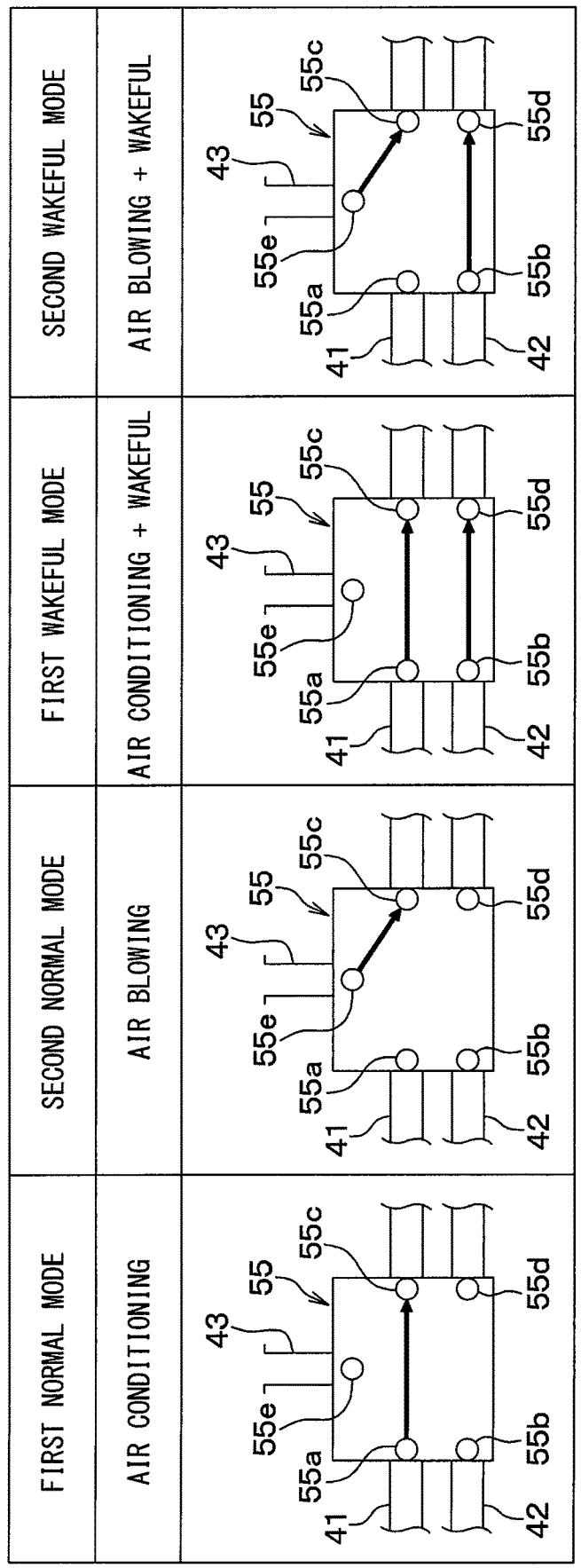
FIG. 10 is an illustrative view illustrating a variation of a seat air conditioning mode of the seat air conditioning unit according to the second embodiment.

In the air conditioning device for a vehicle 1 according to the present embodiment, as shown in FIG. 10, with a change in the air supply path to the seat air conditioning unit 5, the seat air conditioning mode can be switched to a first normal mode, a second normal mode, a first wakeful mode, and a second wakeful mode.

The first normal mode is a mode for blowing out the air whose temperature has been adjusted by the interior air conditioning unit 2 through the main duct member 41 from the seat 11. The first normal mode is set when an air conditioning load is high (for example, immediately after activation of the seat air conditioning unit 5) in the normal seat air conditioning mode shown in Step S130 of FIG. 3.

Specifically, in the first normal mode, the control device 100 controls the path switching mechanism 55 so that the first inlet port 55a and the first outlet port 55c of the path switching mechanism 55 become in the communication state and the second inlet port 55b and the second outlet port 55d become in the blocked state.

Figure 11:
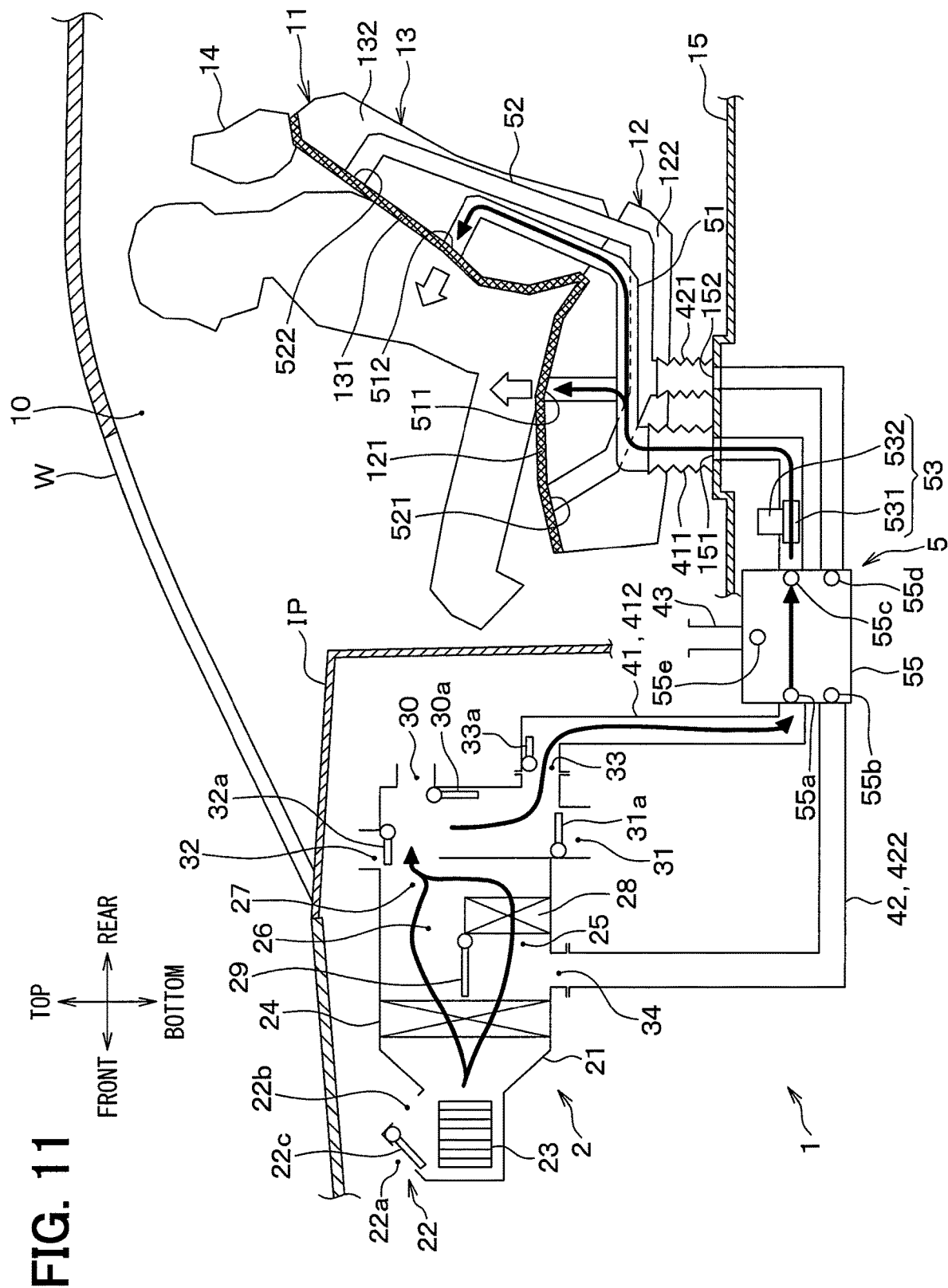
FIG. 11 is an illustrative view illustrating a flow of air in a first normal mode in the air conditioning device for a vehicle according to the second embodiment.

As a result, as indicated by solid arrows in FIG. 11, in the first normal mode, the air that has been adjusted in temperature by the evaporator 24 and the heater core 28 of the interior air conditioning unit 2 is supplied to the seat air conditioning unit 5 through the main duct member 41. Then, the air supplied to the seat air conditioning unit 5 is blown out from the front side of the seat 11 through the main blowing duct 51.

Subsequently, the second normal mode is a mode for blowing out the inside air from the seat 11 through the inside air duct member 43. The second normal mode is a mode set when the air conditioning load is low (for example, after a predetermined time has elapsed since the activation of the seat air conditioning unit 5) in the normal seat air conditioning mode shown in Step S130 of FIG. 3. In the second normal mode, the control device 100 controls the path switching mechanism 55 so that the third inlet port 55e and the first outlet port 55c of the path switching mechanism 55 become in the communication state and the second inlet port 55b and the second outlet port 55d become in the blocked state.

Figure 12:
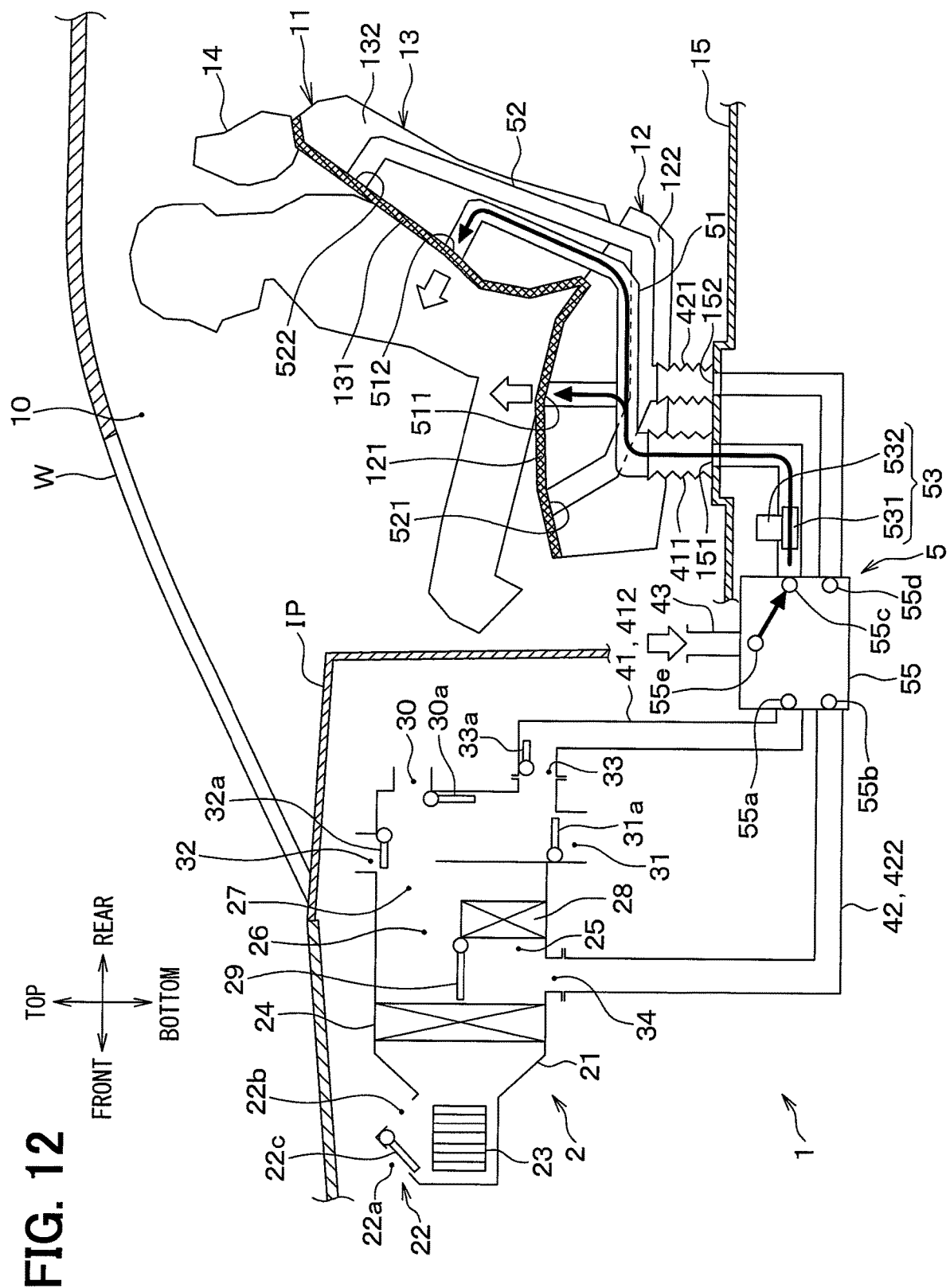
FIG. 12 is an illustrative view illustrating a flow of air in a second normal mode in the air conditioning device for a vehicle according to the second embodiment.

As a result, as indicated by solid arrows in FIG. 12, in the second normal mode, the inside air is supplied to the seat air conditioning unit 5 through the inside air duct member 43. Then, the air supplied to the seat air conditioning unit 5 is blown out from the front side of the seat 11 through the main blowing duct 51.

Subsequently, the first wakeful mode is a mode for blowing out the air whose temperature has been adjusted by the interior air conditioning unit 2 from the seat 11 through the main duct member 41 and also blowing out the air that has been cooled by the evaporator 24 of the interior air conditioning unit 2 from the seat 11 through the auxiliary duct member 42.

The first normal mode is a mode set when the air conditioning load is high (for example, immediately after activation of the seat air conditioning unit 5) in the wakeful seat air conditioning mode shown in Step S140 of FIG. 3. In the first wakeful mode, the control device 100 controls the path switching mechanism 55 so that the first inlet port 55a and the first outlet port 55c of the path switching mechanism 55 become in the communication state and the second inlet port 55b and the second outlet port 55d become in the communication state.

Figure 13:
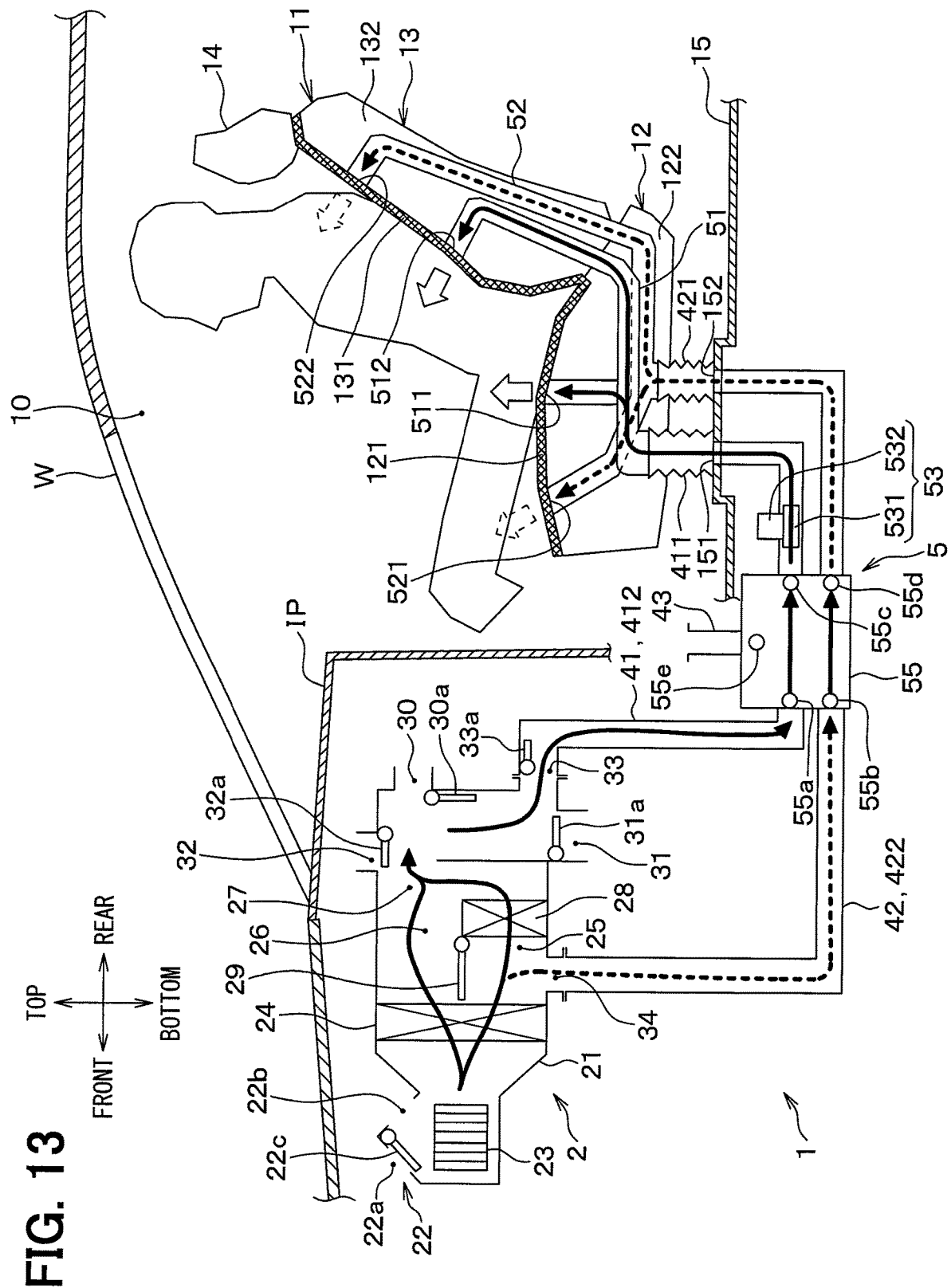
FIG. 13 is an illustrative view illustrating a flow of air in a first wakeful mode in the air conditioning device for a vehicle according to the second embodiment.

As a result, as indicated by solid arrows in FIG. 13, in the first wakeful mode, the air that has been adjusted in temperature by the evaporator 24 and the heater core 28 of the interior air conditioning unit 2 is supplied to the seat air conditioning unit 5 through the main duct member 41. Then, the air supplied to the seat air conditioning unit 5 is blown out from the front side of the seat 11 through the main blowing duct 51.

Further, in the first wakeful mode, as indicated by dotted arrows in FIG. 13, the air that has been cooled by the evaporator 24 of the interior air conditioning unit 2 is supplied to the seat air conditioning unit 5 through the auxiliary duct member 42. Then, the air supplied to the seat air conditioning unit 5 is blown out from the front side of the seat 11 through the auxiliary blowing duct 52.

Subsequently, the second wakeful mode is a mode for blowing out the inside air from the seat 11 through the inside air duct member 43, and also blowing out the air that has been cooled by the evaporator 24 of the interior air conditioning unit 2 from the seat 11 through the auxiliary duct member 42.

The second wakeful mode is a mode set when the air conditioning load is low (for example, after a predetermined time has elapsed since the activation of the seat air conditioning unit 5) in the wakeful seat air conditioning mode shown in Step S140 of FIG. 3. In the second wakeful mode, the control device 100 controls the path switching mechanism 55 so that the third inlet port 55e and the first outlet port 55c of the path switching mechanism 55 become in the communication state and the second inlet port 55b and the second outlet port 55d become in the communication state.

Figure 14:
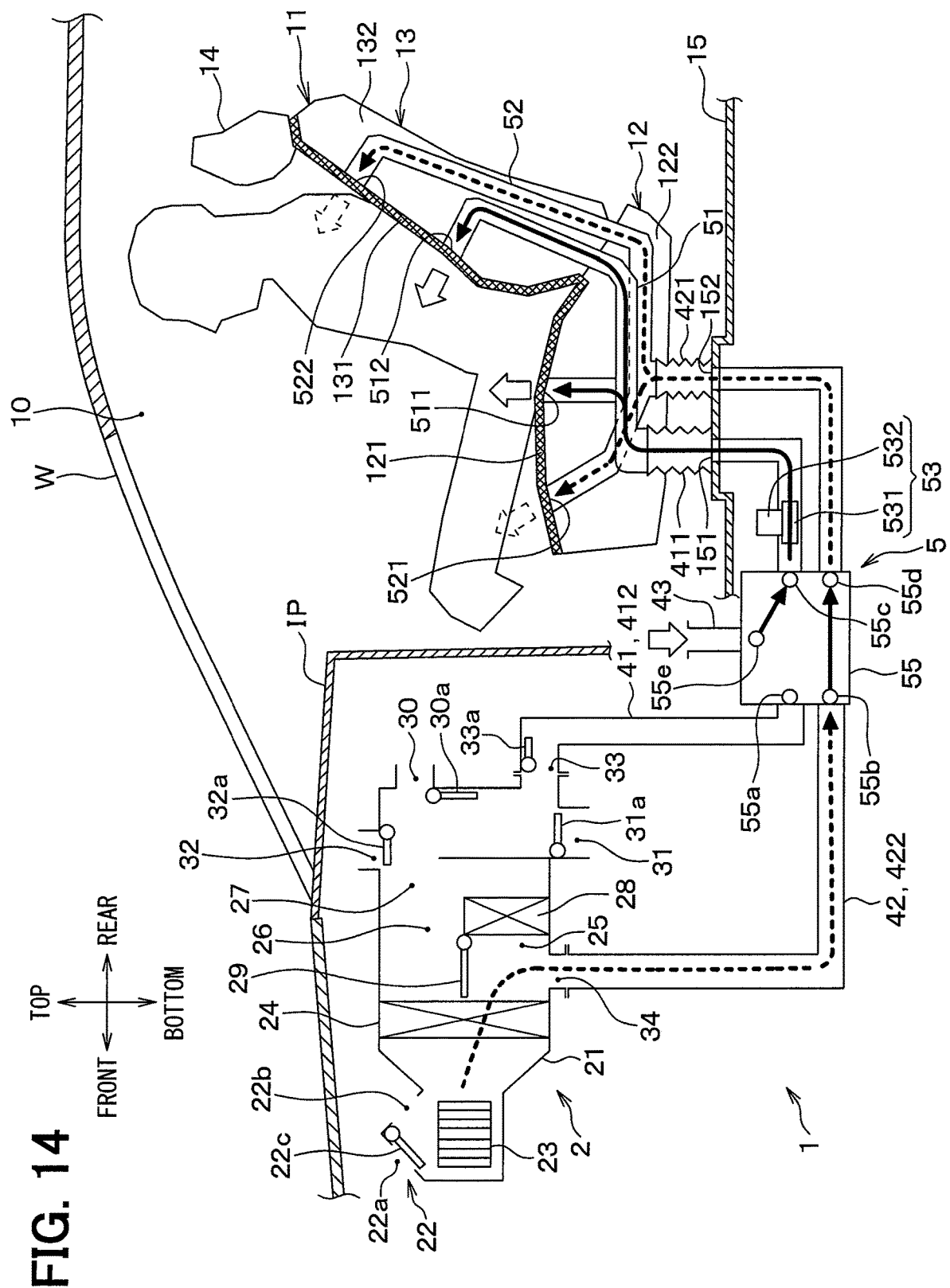
FIG. 14 is an illustrative view illustrating a flow of air in a second wakeful mode in the air conditioning device for a vehicle according to the second embodiment.

As a result, as indicated by solid arrows in FIG. 14, in the second wakeful mode, the inside air is supplied to the seat air conditioning unit 5 through the inside air duct member 43. Then, the air supplied to the seat air conditioning unit 5 is blown out from the front side of the seat 11 through the main blowing duct 51.

Further, in the second wakeful mode, as indicated by dotted arrows in FIG. 14, the air that has been cooled by the evaporator 24 of the interior air conditioning unit 2 is supplied to the seat air conditioning unit 5 through the auxiliary duct member 42. Then, the air supplied to the seat air conditioning unit 5 is blown out from the front side of the seat 11 through the auxiliary blowing duct 52.

Other structures and operations are the same as those of the first embodiment. The air conditioning device for a vehicle 1 according to the present embodiment can obtain the same advantages as those in the first embodiment, which are obtained from the configuration common to the first embodiment.

In particular, in the air conditioning device for a vehicle according to the present embodiment, the air can be supplied to the seat air conditioning unit 5 through the inside air duct member 43 different from the main duct member 41 and the auxiliary duct member 42. In this way, with the configuration providing the multiple paths for supplying the air to the seat air conditioning unit 5, the thermal sensation responsive to the user's request can be more appropriately provided.

In the present embodiment, the first normal mode and the second normal mode are exemplified as the normal seat air conditioning mode, but the present disclosure is not limited to the above configuration. In the normal seat air conditioning mode, when a cold air is blown out from the seat 11, the cold air may be supplied to the seat air conditioning unit 5 through the auxiliary duct member 42.

In that case, the control device 100 may control the path switching mechanism 55 so that the second inlet port 55b and the second outlet port 55d communicate with each other and the first inlet port 55a and the first outlet port 55c are blocked.

According to the above configuration, the air that has been cooled by the evaporator 24 of the interior air conditioning unit 2, that is, the air lowest in temperature among the interior air conditioning unit 2 is supplied to the seat air conditioning unit 5 through the auxiliary duct member 42. Then, the air supplied to the seat air conditioning unit 5 is blown out from the front side of the seat 11 through the auxiliary blowing duct 52. As described above, with the provision of the seat air conditioning mode in which the low temperature air is blown out from the seat 11 in this manner, the immediate effectiveness of air conditioning in the summer and the like can be improved.

Other Embodiments

The typical embodiments disclosed in the present disclosure have been described above. However, the present disclosure is not limited to the embodiments described above, but can be variously modified.

As in the respective embodiments described above, it is desirable that the main blowing duct 51 and the auxiliary blowing duct 52 are configured to be independent from each other so that the air flowing through each of the main blowing duct 51 and the auxiliary blowing duct 56 is not mixed with each other, but the present disclosure is not limited to the above configuration. For example, the main blowing duct 51 and the auxiliary blowing duct 52 may partly communicate with each other.

Further, as in the respective embodiments described above, it is preferable to add the auxiliary blower 53 in order to improve the comfort of the user, but the present disclosure is not limited to the above configuration, and the auxiliary blower 53 may be eliminated.

Further, as in the respective embodiments described above, from the viewpoint of providing the thermal sensation according to the user's request, it is preferable to include the path switching mechanism 55, but the present disclosure is not limited to the above configuration, and the path switching mechanism 55 may be eliminated.

It is desirable to provide the multiple air flow ducts independent from each other for both of the seat cushion portion 12 and the seat back portion 13 as in the above embodiments, but the present disclosure is not limited to the above configuration.

For example, the multiple air flow ducts independent of each other may be provided for the seat cushion portion 12 of the seat cushion portion 12 and the seat back portion 13. In that case, the different thermal sensations can be imparted to the lower body of the user who is liable to be wetted when the user comes into contact with the seat 11.

In addition, the multiple air flow ducts independent of each other may be provided for the seat back portion 13 of the seat cushion portion 12 and the seat back portion 13. In that case, different thermal sensations can be imparted to the upper body of the user who is sensitive to a temperature change.

Further, according to the respective embodiments described above, the example in which the air conditioning mode is switched from the normal seat air conditioning mode to the wakeful seat air conditioning mode when the reduced wakefulness state is detected by the reduced wakefulness detection unit 104 has been described, but the present disclosure is not limited to the above configuration.

The air conditioning device for a vehicle 1 may be configured so as to switch from the normal seat air conditioning mode to the wakeful seat air conditioning mode, for example, when a predetermined time (for example, 20 minutes to 60 minutes) has elapsed since the start of the seat air conditioning unit 5. Further, the air conditioning device for a vehicle 1 may be configured to execute the wakeful seat air conditioning mode also for changing a mood of the user when a continuous operation state of the vehicle continues for a predetermined time (for example, 20 minutes to 60 minutes).

In the respective embodiments described above, elements configuring the embodiments are not necessarily indispensable as a matter of course, except when the elements are particularly specified as indispensable and the elements are considered as obviously indispensable in principle.

In the respective embodiments described above, when numerical values such as the number, figures, quantity, a range of configuration elements in the embodiments are described, the numerical values are not limited to a specific number, except when the elements are particularly specified as indispensable and the numerical values are obviously limited to the specific number in principle.

In the respective embodiments described above, when a shape, and a positional relationship of the configuration elements are described, the configuration elements are not limited to the shape, and the positional relationship, except when the configuration elements are particularly specified and are limited to a specific shape, and positional relationship in principle.

CONCLUSION

According to a first aspect shown in part or all of the embodiments described above, the air conditioning device for a vehicle includes the first duct member and the second duct member for guiding the air different in temperature to the seat air conditioning unit.

Further, according to a second aspect, the second duct member is connected to the interior air conditioning unit so as to guide the air having passed through the heating heat exchanger in the interior air conditioning unit to the seat air conditioning unit.

As described above, with the configuration in which the air whose temperature has been adjusted by the interior air conditioning unit is guided to the seat air conditioning unit through the second duct member, the air greatly different in temperature can be blown out to the user through the first duct member and the second duct member at the same time. The configuration in which the air different in temperature is blown out at the same time as described above is suitable for the prevention of drowsiness of the user.

According to a third aspect, the air conditioning device for a vehicle includes the air conditioning blower that is disposed inside the interior air conditioning unit and generates the air flow directed toward the vehicle interior space, and the auxiliary blower that generates the air flow toward the seat air conditioning unit from at least one of the first duct member and the second duct member.

As described above, with the configuration having the auxiliary blower, the volume of air blown out through the seat air conditioning unit can be sufficiently secured. Such a configuration is suitable for imparting the different thermal sensations to the user.

According to a fourth aspect, the air conditioning device for a vehicle includes the air conditioning blower that is disposed inside the interior air conditioning unit and generates the air flow directed toward the vehicle interior space, and the auxiliary blower that generates the air flow toward the seat air conditioning unit from the second duct member. The first duct member is connected to the interior air conditioning unit so that the air flow generated by the air conditioning blower flows in the first duct member.

According to the above configuration, even when the air whose temperature has been adjusted by the cooling heat exchanger and the heating heat exchanger through the second duct member is guided to the seat air conditioning unit, the volume of air flowing from the second duct to the seat air conditioning unit can be sufficiently secured.

According to a fifth aspect, the air conditioning device for a vehicle includes the auxiliary blower that generates the air flow from each of the first duct member and the second duct member toward the seat air conditioning unit. As described above, with the configuration having the auxiliary blower that generates the air flow in both of the first duct member and the second duct member, the volume of air blown out through the seat air conditioning unit can be sufficiently secured. Such a configuration is suitable for imparting the different thermal sensations to the user.

According to a sixth aspect, the auxiliary blower includes the first fan that is disposed in the first duct member, the second fan that is disposed in the second duct member, and the single electric motor that rotationally drives the first fan and the second fan. In this way, with a configuration in which a common electric motor generates the air flow in both of the first duct and the second duct, an increase in the number of parts accompanying the addition of the auxiliary blower 53A can be prevented.

According to a seventh aspect, the air conditioning device for a vehicle includes the path switching mechanism that is configured so as to switch between the first supply path for supplying the air from both of the respective duct members to the seat air conditioning unit and the second supply path for supplying the air from one of the respective duct members to the seat air conditioning unit.

According to the above configuration, for example, the supply path can be switched to the first supply path in a situation where the different thermal sensations are required and the supply path can be switched to the second supply path in a situation where the different thermal sensations are not required, thereby being capable of providing the thermal sensation according to the user's request.

According to an eighth aspect, the path switching mechanism is configured so as to supply the air to the seat air conditioning unit through the third duct member different from the first duct member and the second duct member. In this way, with the configuration providing the multiple paths for supplying the air to the seat air conditioning unit, the thermal sensation responsive to the user's request can be more appropriately provided.

Further, according to a ninth aspect, the seat air conditioning unit is provided with the first air flow duct for guiding the air supplied through the first duct member to the front side of the seat and the second air flow duct for guiding the air supplied through the second duct member to the front side of the seat. The first air flow duct and the second air flow duct are configured to be independent from each other so that the air flowing through each of the first air flow duct and the second air flow duct do not mix with each other.

As described above, with the configuration in which the first air flow passage and the second air flow passage corresponding to the first duct and the second duct, individually, are provided in the seat air conditioning unit, the air can be blown out from the front side of the seat in a state where a temperature difference between the air from the first duct and the air from the second duct is ensured.

What is claimed is:
1. An air conditioning device for a vehicle, comprising:
a seat air conditioning unit provided in a seat which is disposed in a vehicle interior space, the seat air conditioning unit being configured to blow out air from a front side of the seat;
an interior air conditioning unit that includes a cooling heat exchanger which cools air and a heating heat exchanger which heats air having passed through the cooling heat exchanger, the interior air conditioning unit being configured to blow out air whose temperature has been adjusted by the cooling heat exchanger and the heating heat exchanger into the vehicle interior space;
a first duct member that guides air flowing between the cooling heat exchanger and the heating heat exchanger in the interior air conditioning unit to the seat air conditioning unit; and
a second duct member that guides air higher in temperature than the air flowing between the cooling heat exchanger and the heating heat exchanger to the seat air conditioning unit, wherein
the seat air conditioning unit includes
a first air flow duct that forms an air flow passage which guides the air supplied through the first duct member to the front side of the seat, and
a second air flow duct that forms an air flow passage which guides the air supplied through the second duct member to the front side of the seat, and
the first air flow duct and the second air flow duct are configured to be independent from each other to prevent the air flowing through the first air flow duct and the second air flow duct from mixing with each other.
2. The air conditioning device for a vehicle according to claim 1, wherein
the second duct member is connected to the interior air conditioning unit to guide the air having passed through the heating heat exchanger in the interior air conditioning unit to the seat air conditioning unit.
3. The air conditioning device for a vehicle according to claim 1, further comprising:
an air conditioning blower disposed inside the interior air conditioning unit, the air conditioning blower being configured to generate an air flow directed toward the vehicle interior space; and
an auxiliary blower that generates an air flow toward the seat air conditioning unit from at least one of the first duct member or the second duct member.
4. The air conditioning device for a vehicle according to claim 2, further comprising:
an air conditioning blower that is disposed in the interior air conditioning unit, the air conditioning blower being configured to generate an air flow toward the vehicle interior space; and
an auxiliary blower that generates an air flow from the second duct member to the seat air conditioning unit, wherein
the first duct member is connected to the interior air conditioning unit to allow the air flow generated by the air conditioning blower to flow through the first duct member.
5. The air conditioning device for a vehicle according to claim 1, further comprising:

an auxiliary blower that generates an air flow from each of the first duct member and the second duct member toward the seat air conditioning unit.

6. The air conditioning device for a vehicle according to claim 5, wherein
the auxiliary blower includes a first fan disposed in the first duct member, a second fan disposed in the second duct member, and a single electric motor that rotationally drives the first fan and the second fan.

7. The air conditioning device for a vehicle according to claim 1, further comprising:
a path switching mechanism configured to switch between a first supply path for supplying the air from both the first duct member and the second duct member to the seat air conditioning unit and a second supply path for supplying the air from one of the first duct member or the second duct member to the seat air conditioning unit.

8. The air conditioning device for a vehicle according to claim 7, wherein
the path switching mechanism is configured to supply air to the seat air conditioning unit through a third duct member different from the first duct member and the second duct member.

9. An air conditioning device for a vehicle, comprising:
a seat air conditioning unit provided in a seat which is disposed in a vehicle interior space, the seat air conditioning unit being configured to blow out air from a front side of the seat;
an interior air conditioning unit that includes a cooling heat exchanger which cools air and a heating heat exchanger which heats air having passed through the cooling heat exchanger, the interior air conditioning unit being configured to blow out air whose temperature has been adjusted by the cooling heat exchanger and the heating heat exchanger into the vehicle interior space;
a first duct member that guides air flowing between the cooling heat exchanger and the heating heat exchanger in the interior air conditioning unit to the seat air conditioning unit;
a second duct member that guides air higher in temperature than the air flowing between the cooling heat exchanger and the heating heat exchanger to the seat air conditioning unit;
an air conditioning blower disposed inside the interior air conditioning unit, the air conditioning blower being configured to generate an air flow directed toward the vehicle interior space; and
an auxiliary blower that generates an air flow toward the seat air conditioning unit from at least one of the first duct member or the second duct member.

10. An air conditioning device for a vehicle, comprising:
a seat air conditioning unit provided in a seat which is disposed in a vehicle interior space, the seat air conditioning unit being configured to blow out air from a front side of the seat;
an interior air conditioning unit that includes a cooling heat exchanger which cools air and a heating heat exchanger which heats air having passed through the cooling heat exchanger, the interior air conditioning unit being configured to blow out air whose temperature has been adjusted by the cooling heat exchanger and the heating heat exchanger into the vehicle interior space;
a first duct member that guides air flowing between the cooling heat exchanger and the heating heat exchanger in the interior air conditioning unit to the seat air conditioning unit;
a second duct member that guides air higher in temperature than the air flowing between the cooling heat exchanger and the heating heat exchanger to the seat air conditioning unit; and
an auxiliary blower that generates an air flow from each of the first duct member and the second duct member toward the seat air conditioning unit, wherein
the auxiliary blower includes a first fan disposed in the first duct member, a second fan disposed in the second duct member, and a single electric motor that rotationally drives the first fan and the second fan.

* * * * *